US007836211B2

(12) United States Patent  
Pettey et al.

(10) Patent No.: US 7,836,211 B2
(45) Date of Patent: *Nov. 16, 2010

(54) SHARED INPUT/OUTPUT LOAD-STORE ARCHITECTURE

(75) Inventors: Christopher J. Pettey, Cedar Park, TX (US); Asif Khan, Cedar Park, TX (US); Annette Pagan, Austin, TX (US); Richard E. Pekkala, Austin, TX (US); Robert Haskell Utley, Round Rock, TX (US)

(73) Assignee: Emulex Design and Manufacturing Corporation, Costa Mesa, CA (US)

( * ) Notice: Subject to any disclaimer, the term of this patent is extended or adjusted under 35 U.S.C. 154(b) by 1932 days.

This patent is subject to a terminal disclaimer.

(21) Appl. No.: 10/802,532

(22) Filed: Mar. 16, 2004

(65) Prior Publication Data

US 2004/0210678 A1 Oct. 21, 2004

Related U.S. Application Data

(63) Continuation-in-part of application No. 10/757,713, filed on Jan. 14, 2004, now Pat. No. 7,457,906, and a continuation-in-part of application No. 10/757,711, filed on Jan. 14, 2004, now Pat. No. 7,103,064, and a continuation-in-part of application No. 10/757,714, filed on Jan. 14, 2004, now Pat. No. 7,046,668.

(60) Provisional application No. 60/464,382, filed on Apr. 18, 2003, provisional application No. 60/491,314, filed on Jul. 30, 2003, provisional application No. 60/515,558, filed on Oct. 29, 2003, provisional application No. 60/523,522, filed on Nov. 19, 2003, provisional application No. 60/541,673, filed on Feb. 4, 2004, provisional application No. 60/440,788, filed on Jan. 21, 2003, provisional application No. 60/440,789, filed on Jan. 21, 2003.

(51) Int. Cl.
*G06F 3/00* (2006.01)
(52) U.S. Cl. .............................................. 710/2; 710/30
(58) Field of Classification Search .................... 710/2, 710/30
See application file for complete search history.

(56) References Cited

U.S. PATENT DOCUMENTS 4,058,672 A 11/1977 Crager et al.

(Continued)

FOREIGN PATENT DOCUMENTS

EP 0571691 A 12/1993

(Continued)

OTHER PUBLICATIONS

PCI Express Base Specificattion. Rev. 1.0. Apr. 29, 2002.

(Continued)

*Primary Examiner*—Alford W Kindred
*Assistant Examiner*—Farley J Abad
(74) *Attorney, Agent, or Firm*—Richard K. Huffman; James W. Huffman

(57) ABSTRACT

An apparatus and method are provided that enable I/O devices to be shared and/or partitioned among a plurality of operating system domains within the load-store fabric of each of the operating system domains without requiring modification to the operating system or driver software of the operating system domains. The apparatus includes sharing logic and a first shared input/output (I/O) endpoint. The sharing logic is coupled to a plurality of operating system domains through a load-store fabric. The sharing logic routes transactions between the plurality of operating system domains. The first shared input/output (I/O) endpoint is coupled to the sharing logic. The first shared I/O endpoint requests/completes the transactions for the each of said plurality of operating system domains according to a variant of a protocol that encapsulates an OS domain header within a transaction layer packet.

95 Claims, 20 Drawing Sheets

U.S. PATENT DOCUMENTS

| | | |
|---|---|---|
| 5,280,614 A | 1/1994 | Munroe et al. |
| 5,414,851 A | 5/1995 | Brice, Jr. et al. |
| 5,581,709 A | 12/1996 | Ito et al. |
| 5,590,285 A | 12/1996 | Krause et al. |
| 5,590,301 A | 12/1996 | Guenthner et al. |
| 5,600,805 A | 2/1997 | Fredericks et al. |
| 5,623,666 A | 4/1997 | Pike et al. |
| 5,633,865 A | 5/1997 | Short |
| 5,758,125 A | 5/1998 | Misinai et al. |
| 5,761,669 A | 6/1998 | Montague et al. |
| 5,790,807 A | 8/1998 | Fishler et al. |
| 5,812,843 A | 9/1998 | Yamazaki et al. |
| 5,909,564 A | 6/1999 | Alexander et al. |
| 5,926,833 A | 7/1999 | Rasoulian et al. |
| 6,009,275 A | 12/1999 | DeKoning et al. |
| 6,014,669 A | 1/2000 | Slaughter et al. |
| 6,044,465 A | 3/2000 | Dutcher et al. |
| 6,047,339 A | 4/2000 | Su et al. |
| 6,055,596 A | 4/2000 | Cepulis |
| 6,078,964 A | 6/2000 | Ratcliff et al. |
| 6,112,263 A | 8/2000 | Futral |
| 6,128,666 A | 10/2000 | Muller et al. |
| 6,141,707 A | 10/2000 | Halligan et al. |
| 6,167,052 A | 12/2000 | McNeill et al. |
| 6,170,025 B1 | 1/2001 | Drottar et al. |
| 6,222,846 B1 | 4/2001 | Bonola et al. |
| 6,240,467 B1 | 5/2001 | Beardsley et al. |
| 6,247,077 B1 | 6/2001 | Muller et al. |
| 6,343,324 B1 | 1/2002 | Hubis et al. |
| 6,421,711 B1 | 7/2002 | Blumenau et al. |
| 6,484,245 B1 | 11/2002 | Sanada et al. |
| 6,496,880 B1 | 12/2002 | Ma et al. |
| 6,507,896 B2 | 1/2003 | Sanada et al. |
| 6,510,496 B1 | 1/2003 | Tarui et al. |
| 6,523,096 B2 | 2/2003 | Sanada et al. |
| 6,535,964 B2 | 3/2003 | Sanada et al. |
| 6,542,919 B1 | 4/2003 | Wendorf et al. |
| 6,556,580 B1 | 4/2003 | Wang et al. |
| 6,601,116 B1 | 7/2003 | Shemla et al. |
| 6,615,336 B1 | 9/2003 | Chen et al. |
| 6,622,153 B1 | 9/2003 | Lee et al. |
| 6,633,916 B2 | 10/2003 | Kauffman |
| 6,640,206 B1 | 10/2003 | Callender et al. |
| 6,662,254 B1 | 12/2003 | Tal et al. |
| 6,665,304 B2 | 12/2003 | Beck et al. |
| 6,678,269 B1 | 1/2004 | Michels et al. |
| 6,728,844 B2 | 4/2004 | Sanada et al. |
| 6,742,090 B2 | 5/2004 | Sanada et al. |
| 6,745,281 B1 | 6/2004 | Saegusa |
| 6,760,793 B2 | 7/2004 | Kelley |
| 6,772,270 B1 | 8/2004 | Kurpanek |
| 6,779,071 B1 | 8/2004 | Kallat et al. |
| 6,820,168 B2 | 11/2004 | Tanaka et al. |
| 6,823,458 B1 * | 11/2004 | Lee et al. ............. 726/16 |
| 6,834,326 B1 | 12/2004 | Wang et al. |
| 6,859,825 B1 | 2/2005 | Williams |
| 6,877,073 B2 | 4/2005 | Sanada et al. |
| 6,918,060 B2 | 7/2005 | Fanning |
| 6,944,617 B2 | 9/2005 | Harriman |
| 6,961,761 B2 | 11/2005 | Masuyama et al. |
| 7,013,353 B2 | 3/2006 | Parthasarathy et al. |
| 7,024,510 B2 | 4/2006 | Olarig |
| 7,046,668 B2 | 5/2006 | Pettey et al. |
| 7,103,064 B2 | 9/2006 | Pettey et al. |
| 7,136,953 B1 | 11/2006 | Bisson et al. |
| 7,152,128 B2 | 12/2006 | Wehage et al. |
| 7,231,486 B2 | 6/2007 | Ajanovic et al. |
| 7,493,416 B2 | 2/2009 | Pettey |
| 2001/0032280 A1 | 10/2001 | Osakada et al. |
| 2002/0016845 A1 | 2/2002 | Palmer et al. |
| 2002/0026558 A1 | 2/2002 | Reuter et al. |
| 2002/0027906 A1 | 3/2002 | Athreya et al. |
| 2002/0029319 A1 | 3/2002 | Robbins et al. |
| 2002/0052914 A1 | 5/2002 | Zalewski et al. |
| 2002/0072892 A1 | 6/2002 | Shirley |
| 2002/0078271 A1 | 6/2002 | Berry |
| 2002/0099901 A1 | 7/2002 | Tanaka et al. |
| 2002/0126693 A1 | 9/2002 | Stark et al. |
| 2002/0172195 A1 | 11/2002 | Pekkala et al. |
| 2002/0186694 A1 | 12/2002 | Mahajan et al. |
| 2003/0003140 A1 | 1/2003 | Rimmer |
| 2003/0069975 A1 | 4/2003 | Abjanic et al. |
| 2003/0069993 A1 | 4/2003 | Na et al. |
| 2003/0079055 A1 | 4/2003 | Chen |
| 2003/0091037 A1 | 5/2003 | Latif et al. |
| 2003/0112805 A1 | 6/2003 | Stanton |
| 2003/0123484 A1 * | 7/2003 | Harriman ............. 370/471 |
| 2003/0126202 A1 | 7/2003 | Watt |
| 2003/0131105 A1 | 7/2003 | Czeiger et al. |
| 2003/0158992 A1 | 8/2003 | Ajanovic et al. |
| 2003/0163341 A1 | 8/2003 | Banerjee et al. |
| 2003/0188060 A1 | 10/2003 | Van Hensbergen |
| 2003/0200315 A1 | 10/2003 | Goldenberg et al. |
| 2003/0200330 A1 | 10/2003 | Oelke et al. |
| 2003/0204593 A1 | 10/2003 | Brown et al. |
| 2003/0208531 A1 | 11/2003 | Matters et al. |
| 2003/0208551 A1 | 11/2003 | Matters et al. |
| 2003/0208631 A1 | 11/2003 | Matters et al. |
| 2003/0208632 A1 | 11/2003 | Rimmer |
| 2003/0208633 A1 | 11/2003 | Rimmer |
| 2003/0212830 A1 | 11/2003 | Greenblat et al. |
| 2003/0217183 A1 | 11/2003 | Rimmer et al. |
| 2004/0003140 A1 | 1/2004 | Rimmer |
| 2004/0013092 A1 | 1/2004 | Betker et al. |
| 2004/0013124 A1 | 1/2004 | Peebles et al. |
| 2004/0019714 A1 | 1/2004 | Kelley et al. |
| 2004/0019726 A1 | 1/2004 | Kelley et al. |
| 2004/0019729 A1 | 1/2004 | Kelley et al. |
| 2004/0024894 A1 | 2/2004 | Osman et al. |
| 2004/0025166 A1 | 2/2004 | Adlung et al. |
| 2004/0054838 A1 | 3/2004 | Hoese et al. |
| 2004/0068591 A1 | 4/2004 | Workman et al. |
| 2004/0073712 A1 | 4/2004 | Larson et al. |
| 2004/0073716 A1 | 4/2004 | Boom et al. |
| 2004/0081104 A1 | 4/2004 | Pan et al. |
| 2004/0088414 A1 | 5/2004 | Flynn et al. |
| 2004/0098532 A1 | 5/2004 | Huang et al. |
| 2004/0109460 A1 | 6/2004 | Banks et al. |
| 2004/0109473 A1 | 6/2004 | Lebizay et al. |
| 2004/0111559 A1 | 6/2004 | Heil |
| 2004/0117516 A1 | 6/2004 | Date |
| 2004/0117536 A1 | 6/2004 | Franke et al. |
| 2004/0117598 A1 | 6/2004 | Arimilli et al. |
| 2004/0123014 A1 | 6/2004 | Schaefer et al. |
| 2004/0128410 A1 | 7/2004 | Mayhew et al. |
| 2004/0165588 A1 | 8/2004 | Pandya |
| 2004/0213211 A1 | 10/2004 | Green |
| 2004/0221047 A1 | 11/2004 | Grover et al. |
| 2004/0233921 A1 | 11/2004 | Krieg et al. |
| 2004/0249975 A1 | 12/2004 | Tuck et al. |
| 2004/0260842 A1 | 12/2004 | Pettey et al. |
| 2004/0268015 A1 | 12/2004 | Pettey et al. |
| 2005/0027900 A1 | 2/2005 | Pettey |
| 2005/0050240 A1 | 3/2005 | Wilkins et al. |
| 2005/0053060 A1 | 3/2005 | Pettey |
| 2005/0080982 A1 | 4/2005 | Vasilevsky et al. |
| 2005/0097271 A1 | 5/2005 | Davies et al. |
| 2005/0102437 A1 | 5/2005 | Pettey et al. |
| 2005/0114623 A1 | 5/2005 | Craddock et al. |
| 2005/0147117 A1 | 7/2005 | Pettey et al. |
| 2005/0157725 A1 | 7/2005 | Pettey |
| 2005/0157754 A1 | 7/2005 | Pettey |
| 2005/0169258 A1 | 8/2005 | Millet et al. |
| 2005/0172041 A1 | 8/2005 | Pettey |

| | | | |
|---|---|---|---|
| 2005/0172047 A1 | 8/2005 | Pettey | |
| 2005/0238035 A1 | 10/2005 | Riley | |
| 2006/0092928 A1 | 5/2006 | Pike et al. | |
| 2006/0206655 A1 | 9/2006 | Chappell et al. | |
| 2007/0050520 A1 | 3/2007 | Riley | |
| 2008/0117909 A1 | 5/2008 | Johnson | |

FOREIGN PATENT DOCUMENTS

| | | |
|---|---|---|
| EP | 0574691 A | 12/1993 |
| EP | 0935200 | 11/1999 |
| EP | 1115064 A2 | 7/2001 |
| EP | 1376932 A2 | 1/2004 |
| JP | 2002084311 A | 3/2002 |
| JP | 2002183102 A | 6/2002 |
| TW | 545015 | 8/2003 |
| WO | WO94/19749 | 1/1994 |
| WO | WO9929071 A | 6/1999 |
| WO | WO03085535 A2 | 10/2003 |

OTHER PUBLICATIONS

Cohen et al. "PCI Express Architecture Power Management." Rev 1.1. Nov. 8, 2002.
Forouzan, Behrouz A. "Data Communications and Networking, Third Edition." pp. 528-536. McGraw-Hill, 2004, 2001, 1998.
Seifert, Rich. "The Switch Book, The Complete Guide to LAN Switching Technology." pp. 431-473. John Wiley & Sons. 2000.
"Catalyst 3550 Multilayer Switch Software Configuration Guide." Chapter 13, pp. 1-14. Cisco Systems. Apr. 2002.
"802.1Q, IEEE Standards for Local and Metropolitan Area Networks, Virtual Bridged Local Area Networks." IEEE. May 7, 2003.
PCI-SIG, PCI Local Bus Specification. Dec. 18, 1998. Revision 2.2, pp. 189-220. http://www.pcisig.com/home.
"Network Interface Controller." FOLDOC—Free On-Line Dictionary of Computing. Http://foldoc.org/index.cgi?query=network+interface+controller. Apr. 11, 2008.
Holland et al. "Dynamic Switching between One-to-Many Download Methods I "ALL-IP" Cellular Networks" (abstract only) Publication date: May-Jun. 2006.
Koellner, Gregory. "NPIV Functionality Profile." Presentation, Jun. 5, 2002. Presentation # T11/02-340v0. Text # T11/02-338v0. www.t11.org.
INCITS working draft proporsed American National Standard for Information Technology, Fibre Channel Framing and Signaling-2 (FC-FS-2). Jan. 16, 2004. Rev. 0.05. pp. i, 65, 67, 76, 80. http://www.t11.org/index.html.
PCI-SIG, PCI Local Bus Specification. Dec. 18, 1998. Revision 2.2, pp. 214-220. http://www.pcisig.com/home.
PCI-SIG, PCI Express Base Specification. Apr. 15, 2003. Revision 1.0a. pp. 27, 259-260. http://www.pcisig.com/home.
Kleiman et al. "SunOS on SPARC." (abstract only) Publication Date: Feb. 29-Mar. 3, 1988.
Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_PI-8_0verview_-_Spring_IDF_2004_Final.pdf.
"XILINX, Designing Network Attached Storage Platform With Advanced Switching" (XP002328191). Sep. 16, 2003. Retrieved from the Internet: URL:http://www.asi-sig.org/education/usage/xilinx_storage_usage.pdf.
Karin S. Puranik: "Advanced Switching Extends PCI Express" XCELL Journal, (XP002328192). Retrieved from the Internet: URL:www.xilinx.com/publications/xcellonline/xcell_47/xc_pdf/xc_pcix47.pdf.
Anonymous: "Fabrics and Application Characteristics for AdvancedTCA* Architectures" Intel Technology Journal, vol. 07, No. 04, Nov. 14, 2003 (XP002328193), ISSN: 1535-864X. Retrieved from the Internet: URL:www.intel.com/technology/Itj/2003/volume07Issue04/art02_fabrics/vol7iss4art02.pdf.
David Mayhew et al. "PCI Express and Advanced Switching: Evolutionary Path to Building Next Generation Interconnects" High Performance Interconnects, 2003. Proceedings. 11th Symposium on Aug. 20-22, 2003, Piscataway, NJ, USA. IEEE, Aug. 20, 2003, pp. 21-29, (XP010657970). ISBN: 0-7695-2012-X.
Marek Piekarski. "Advanced Switching Interconnect and Blade Server Re-Purposing in the Data Center." Aug. 21, 2004. XP002341367. URL: http://www.asi-sig.org/education/white_papers/ASWhitePaper_Final_Copy.pdf.
Ajay V Bhatt. "Creating a Third Generation I/O Interconnect" Jun. 4, 2003 Intel, XP002354597 http://www.intel.com/technology/pciexpress/downloads/3rdGenWhitePaper.pdf retrieved on Nov. 15, 2005.
"PCI Express Base Specification." Revision 1.0. PCI-SIG. Apr. 29, 2002. pp. 17-18.
Mehta, Pranav. "Advanced Switching boosts PCI Express." EE Times. CommsDesign. Online Oct. 28, 2002. Retrieved from Internet Nov. 30, 2005. <http://www.commsdesign.com/design_corner/showArticle.jhtml?articleID=16505864>.
"Understanding PCI Bus, PCI-Express and Infiniband Architecture" (White Paper); Mellanox Technologies, Inc; 2900 Stender Way, Santa Clara, CA 95054, Document No. 2006WP.
Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_PI-8_0verview_-_Spring_IDF_2004_Final.pdf.
"Xilinx, Designing Network Attached Storage Platform With Advanced Switching" (XP002328191). Sep. 16, 2003. Retrieved from the Internet: URL:http://www.asi-sig.org/education/usage/xilinx_storage_usage.pdf.
Karin S. Puranik: "Advanced Switching Extends PCI Express" XCELL Journal, (XP002328192).Retrieved from the Internet: URL:www.xilinx.com/publications/xcellonline/xcell_47/xc_pdf/xc_pcix47.pdf, Fall 2003.
Anonymous: "Fabrics and Application Characteristics for AdvancedTCA* Architectures" Intel Technology Journal, vol. 07, No. 04, Nov. 14, 2003 (XP002328193), ISSN: 1535-864X. Retrieved from the Internet: URL:www.intel.com/technology/2003/volume07Issue04/art02_fabrics/vol7iss4art02.pdf.
David Mayhew et al. "PCI Express and Advanced Switching: Evolutionary Path to Building Next Generation Interconnects" High Performance Interconnects, 2003. Proceedings. 11th Symposium on Aug. 20-22, 2003, Piscataway, NJ, USA. IEEE, Aug. 20, 2003, pp. 21-29, (XP010657970). ISBN: 0-7695-2012-X.
Dugan et al.., "N Port ID Virtualization," Nov. 29, 2001, Document No. 01-627v0, IBM Corporation, http://www.t11.org.
Dugan et al.., "N_Port Virtualization: Proposed FC-FS Modifications," Jan. 19, 2002, Document No. 02-008v0, IBM Corporation, http://www.t11.org.
"Fibre Channel - Framing and signaling (FC-FS)," ANSI/INCITS Standard 373-2003, Oct. 22, 2003, pp. 307 and 311, American National Standards Institute, Inc., New York, NY, USA.

* cited by examiner

PI  Protocol ID Field
OSD OS Domain Number
R   Reserved

SHARED INPUT/OUTPUT LOAD-STORE ARCHITECTURE

CROSS-REFERENCE TO RELATED APPLICATIONS

This application claims the benefit of the following U.S. Provisional Applications, which are herein incorporated by reference for all intents and purposes.

| SERIAL NUMBER | FILING DATE | TITLE |
| --- | --- | --- |
| 60/464382 (NEXTIO. 0103) | Apr. 18, 2003 | SHARED-IO PCI COMPLIANT SWITCH |
| 60/491314 (NEXTIO. 0104) | Jul. 30, 2003 | SHARED NIC BLOCK DIAGRAM |
| 60/515558 (NEXTIO. 0105) | Oct. 29, 2003 | NEXIS |
| 62/523522 (NEXTIO. 0106) | Nov. 19, 2003 | SWITCH FOR SHARED I/O FABRIC |
| 60/541673 (NEXTIO. 0107) | Feb. 4, 2004 | PCI SHARED I/O WIRE LINE PROTOCOL |

This application is a continuation-in-part of the following co-pending U.S. patent applications:

| SERIAL NUMBER | FILING DATE | TITLE |
| --- | --- | --- |
| 10757713 (NEXTIO.0301) | Jan. 14, 2004 | METHOD AND APPARATUCS FOR SHARED I/O IN A LOAD/STORE FABRIC |
| 10757711 (NEXTIO.0302) | Jan. 14, 2004 | METHOD AND APPARATUS FOR SHARED I/O IN A LOAD/STORE FABRIC |
| 10/757714 (NEXTIO.0300 | Jan. 14, 2004 | METHOD AND APPARATUS FOR SHARED I/O IN A LOAD/STORE FABRIC |

All of the aforementioned co-pending U.S. patent applications claim the benefit of the following U.S. Provisional Applications:

| SER. NO. | FILING DATE | TITLE |
| --- | --- | --- |
| 60/440,788 (NEXTIO.0101) | Jan. 21, 2003 | SHARED IO ARCHITECTURE |
| 60/440,789 (NEXTIO.0102) | Jan. 21, 2003 | 3GIO-XAUI COMBINED SWITCH |
| 60/464,382 (NEXTIO.0103) | Apr. 18, 2003 | SHARED-IO PCI COMPLIANT SWITCH |
| 60/491,314 (NEXTIO.0104) | Jul. 30, 2003 | SHARED NIC BLOCK DIAGRAM |
| 60/515,558 (NEXTIO.0105) | Oct. 29, 2003 | NEXIS |
| 60/523,522 (NEXTIO.0106) | Nov. 19, 2003 | SWITCH FOR SHARED I/O FABRIC |

BACKGROUND OF THE INVENTION

1. Field of the Invention

This invention relates in general to the field of computer network architecture, and more specifically to an architecture that enables sharing and/or partitioning of input/output (I/O) endpoint devices within a load-store fabric.

2. Description of the Related Art

Modern computer architecture may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves.

A processing complex may be as simple as a single processing core, such as a Pentium microprocessor, it might be as complex as two or more processing cores. These two or more processing cores may reside on separate devices or integrated circuits, or they may be part of a single integrated circuit. Within the scope of the present invention, a processing core is hardware, microcode (i.e., firmware), or a combination of hardware and microcode that is capable of executing instructions from a particular instruction set architecture (ISA) such as the x86 ISA. Multiple processing cores within a processing complex may execute instances of the same operating system (e.g., multiple instances of Unix), they may run independent operating systems (e.g., one executing Unix and another executing Windows XP), or they may together execute instructions that are part of a single instance of a symmetrical multi-processing (SMP) operating system. Within a processing complex, multiple processing cores may access a shared memory or they may access independent memory devices.

The interface between the processing complex and I/O is commonly known as the chipset. The chipset interfaces to the processing complex via a bus referred to as the HOST bus. The "side" of the chipset that interfaces to the HOST bus is typically referred to as the "north side" or "north bridge." The HOST bus is generally a proprietary bus designed to interface to memory, to one or more processing complexes, and to the chipset. On the other side ("south side") of the chipset are buses which connect the chipset to I/O devices. Examples of such buses include ISA, EISA, PCI, PCI-X, and AGP.

I/O devices allow data to be transferred to or from a processing complex through the chipset on one or more of the busses supported by the chipset. Examples of I/O devices include graphics cards coupled to a computer display; disk controllers (which are coupled to hard disk drives or other data storage systems); network controllers (to interface to networks such as Ethernet); USB and Firewire controllers which interface to a variety of devices from digital cameras to external data storage to digital music systems, etc.; and PS/2 controllers for interfacing to keyboards/mice. I/O devices are designed to connect to the chipset via one of its supported interface buses. For instance, modern computers typically couple graphic cards to the chipset via an AGP bus. Ethernet cards, SATA, Fiber Channel, and SCSI (data storage) cards, USB controllers, and Firewire controllers all connect to the chipset via a Peripheral Component Interconnect (PCI) bus. PS/2 devices are coupled to the chipset via an ISA bus.

The above description is general, yet one skilled in the art will appreciate from the above discussion that, regardless of the type of computer, its configuration will include a processing complex for executing instructions, an interface to I/O, and I/O devices themselves that allow the processing complex to communicate with the outside world. This is true whether the computer is an inexpensive desktop in a home, a high-end workstation used for graphics and video editing, or a clustered server which provides database support or web services to hundreds within a large organization.

A problem that has been recognized by the present inventors is that the requirement to place a processing complex, I/O interface, and I/O devices within every computer is costly and lacks flexibility. That is, once a computer is purchased, all of its subsystems are static from the standpoint of the user. To change a processing complex while still utilizing the same I/O interface and I/O devices is an extremely difficult task. The I/O interface (e.g., the chipset) is typically so closely coupled to the architecture of the processing complex that swapping one without the other doesn't make sense. Furthermore, the I/O devices are typically integrated within the computer, at least for servers and business desktops, such that upgrade or modification of the computer's I/O capabilities ranges in difficulty from extremely cost prohibitive to virtually impossible.

An example of the above limitations is considered helpful. A popular network server produced by Dell Computer Corporation is the Dell PowerEdge 1750®. This server includes a processing core designed by Intel® (a Xeon® microprocessor) along with memory. It has a server-class chipset (i.e., I/O interface) for interfacing the processing complex to I/O controllers/devices. And, it has the following onboard I/O controllers/devices: onboard graphics for connecting to a display, onboard PS/2 for connecting a mouse/keyboard, onboard RAID control for connecting to data storage, onboard network interface controllers for connecting to 10/100 and 1 gigabit (Gb) Ethernet; and a PCI bus for adding other I/O such as SCSI or Fiber Channel controllers. It is believed that none of the onboard features is upgradeable.

As noted above, one of the problems with a highly integrated architecture is that if another I/O demand emerges, it is difficult and costly to implement the upgrade. For example, 10 Gigabit (Gb) Ethernet is on the horizon. How can 10 Gb Ethernet capabilities be easily added to this server? Well, perhaps a 10 Gb Ethernet controller could be purchased and inserted onto an existing PCI bus within the server. But consider a technology infrastructure that includes tens or hundreds of these servers. To move to a faster network architecture requires an upgrade to each of the existing servers. This is an extremely cost prohibitive scenario, which is why it is very difficult to upgrade existing network infrastructures.

The one-to-one correspondence between the processing complex, the interface to the I/O, and the I/O controllers/devices is also costly to the manufacturer. That is, in the example presented above, many of the I/O controllers/devices are manufactured on the motherboard of the server. To include the I/O controllers/devices on the motherboard is costly to the manufacturer, and ultimately to an end user. If the end user utilizes all of the I/O capabilities provided, then a cost-effective situation exists. But if the end user does not wish to utilize, say, the onboard RAID or the 10/100 Ethernet, then s/he is still required to pay for its inclusion. Such one-to-one correspondence is not a cost-effective solution.

Now consider another emerging platform: the blade server. A blade server is essentially a processing complex, an interface to I/O, and I/O controllers/devices that are integrated onto a relatively small printed circuit board that has a backplane connector. The "blade" is configured so that it can be inserted along with other blades into a chassis having a form factor similar to a present day rack server. The benefit of this configuration is that many blade servers can be provided within the same rack space previously required by just one or two rack servers. And while blades have seen growth in market segments where processing density is a real issue, they have yet to gain significant market share for many reasons, one of which is cost. This is because blade servers still must provide all of the features of a pedestal or rack server including a processing complex, an interface to I/O, and the I/O controllers/devices. Furthermore, blade servers must integrate all their I/O controllers/devices onboard because they do not have an external bus which would allow them to interface to other I/O controllers/devices. Consequently, a typical blade server must provide such I/O controllers/devices as Ethernet (e.g., 10/100 and/or 1 Gb) and data storage control (e.g., SCSI, Fiber Channel, etc.)—all onboard.

Infiniband™ is a recent development which was introduced by Intel Corporation and other vendors to allow multiple processing complexes to separate themselves from I/O controllers/devices. Infiniband is a high-speed point-to-point serial interconnect designed to provide for multiple, out-of-the-box interconnects. However, it is a switched, channel-based architecture that drastically departs from the load-store architecture of existing processing complexes. That is, Infiniband is based upon a message-passing protocol where a processing complex communicates with a Host-Channel-Adapter (HCA), which then communicates with all downstream Infiniband devices such as I/O devices. The HCA handles all the transport to the Infiniband fabric rather than the processing complex itself. Within an Infiniband architecture, the only device that remains within the load-store domain of the processing complex is the HCA. What this means is that it is necessary to leave the processing complex load-store domain to communicate with I/O controllers/devices. And this departure from the processing complex load-store domain is one of the limitations that contributed to Infiniband's demise as a solution to providing shared I/O. According to one industry analyst referring to Infiniband, "[i]t was over-billed, over-hyped to be the nirvana-for-everything-server, everything I/O, the solution to every problem you can imagine in the data center, . . . , but turned out to be more complex and expensive to deploy, . . . , because it required installing a new cabling system and significant investments in yet another switched high speed serial interconnect."

Accordingly, the present inventors have recognized that separation of a processing complex, its I/O interface, and the I/O controllers/devices is desirable, yet this separation must not impact either existing operating systems, application software, or existing hardware or hardware infrastructures. By breaking apart the processing complex from its I/O controllers/devices, more cost effective and flexible solutions can be introduced.

In addition, the present inventors have recognized that such a solution must not be a channel-based architecture, performed outside of the box. Rather, the solution should employ a load-store architecture, where the processing complex sends data directly to or receives data directly from (i.e., in an architectural sense by executing loads or stores) an I/O device (e.g., a network controller or data storage controller). This allows the separation to be accomplished without disadvantageously affecting an existing network infrastructure or disrupting the operating system.

Therefore, what is needed is an apparatus and method which separate a processing complex and its interface to I/O from I/O controllers/devices.

In addition, what is needed is an apparatus and method that allow processing complexes and their I/O interfaces to be designed, manufactured, and sold, without requiring I/O controllers/devices to be provided therewith.

Also, what is needed is an apparatus and method that enable an I/O controller/device to be shared by multiple processing complexes.

Furthermore, what is needed is an I/O controller/device that can be shared by two or more processing complexes using a common load-store fabric.

Moreover, what is needed is an apparatus and method that allow multiple processing complexes to share one or more I/O controllers/devices through a common load-store fabric.

Additionally, what is needed is an apparatus and method that provide switching between multiple processing complexes and shared I/O controllers/devices.

Furthermore, what is needed is an apparatus and method that allow multiple processing complexes, each operating independently and executing an operating system independently (i.e., independent operating system domains) to interconnect to shared I/O controllers/devices in such a manner that it appears to each of the multiple processing complexes that the I/O controllers/devices are solely dedicated to a given processing complex from its perspective. That is, from the standpoint of one of the multiple processing complexes, it must appear that the I/O controllers/devices are not shared with any of the other processing complexes.

Moreover, what is needed is an apparatus and method that allow shared I/O controllers/devices to be utilized by different processing complexes without requiring modification to the processing complexes existing operating systems or other application software.

SUMMARY OF THE INVENTION

The present invention, among other applications, is directed to solving the above-noted problems and addresses other problems, disadvantages, and limitations of the prior art. The present invention provides a superior technique for sharing I/O endpoints within a load-store infrastructure. In one embodiment, an apparatus for sharing input/output (I/O) endpoints is provided. The apparatus includes sharing logic and a first shared input/output (I/O) endpoint. The sharing logic is coupled to a plurality of operating system domains through a load-store fabric. The sharing logic routes transactions between the plurality of operating system domains and the sharing logic. The first shared input/output (I/O) endpoint is coupled to the sharing logic. The first shared I/O endpoint requests/completes the transactions for the each of the plurality of operating system domains according to a variant of a protocol, where the variant includes encapsulating an OS domain header within a transaction layer packet that otherwise comports with the protocol, and where a particular OS domain header associates a particular transaction layer packet with a particular one of the plurality of operating system domains.

One aspect of the present invention contemplates a shared input/output (I/O) mechanism. The shared I/O mechanism includes a load-store fabric that enables operating system domains to share one or more I/O endpoints. The load-store fabric has sharing logic that is coupled to the operating system domains and to the one or more I/O endpoints. The sharing logic routes first transactions to/from the operating systems domains, and routes second transactions to/from the one or more I/O endpoints. Each of the second transactions designates an associated one of the operating system domains for which an operation specified by each of the first transactions be performed. The second transactions comport with a variant of a protocol, where the variant includes encapsulating an OS domain header within a transaction layer packet that otherwise comports with the protocol, and where a particular OS domain header associates a particular transaction layer packet with a particular one of the operating system domains.

Another aspect of the present invention comprehends a method for sharing an input/output (I/O) endpoint within a load-store fabric. The method includes: via sharing logic within the load-store fabric, interconnecting operating system domains to the I/O endpoint; first communicating with each of the operating system domains individually; and second communicating with the I/O endpoint according to a variant of a protocol that provides exclusively for a single operating system domain within the load-store fabric to enable the I/O endpoint to associate a prescribed operation with a corresponding one of the operating system domains, where the variant includes encapsulating an OS domain header within a transaction layer packet that otherwise comports with the protocol, and where a particular OS domain header associates the transaction layer packet with the corresponding one of the operating system domains.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
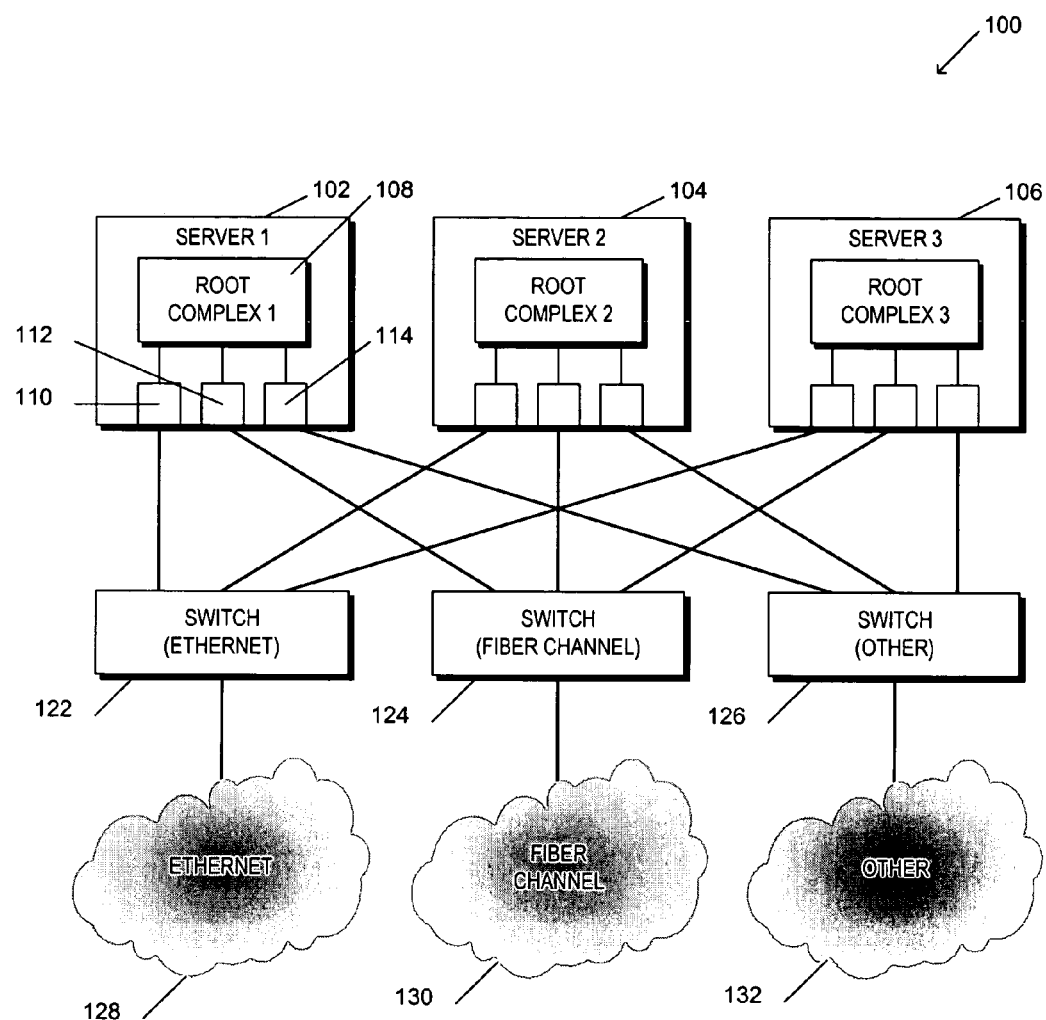
FIG. 1 is an architectural diagram of a computer network of three servers each connected to three different fabrics.

Referring to FIG. 1, a block diagram 100 is shown of a multi-server computing environment. The environment includes three servers 102, 104 and 106. For purposes of this application, a server is a combination of hardware and software that provides services to computer programs in the same or other computers. Examples of computer servers are computers manufactured by Dell, Hewlett Packard, Apple, Sun, etc. executing operating systems such as Windows, Linux, Solaris, Novell, MAC OS, Unix, etc., each having a processing complex (i.e., one or more processing cores) manufactured by companies such as Intel, AMD, IBM, Sun, etc.

Each of the servers 102, 104, 106 has a root complex 108. A root complex 108 typically is a chipset which provides the interface between a processing complex, memory, and downstream I/O controllers/devices (e.g., IDE, SATA, Infiniband, Ethernet, Fiber Channel, USB, Firewire, PS/2). However, in the context of the present invention, a root complex 108 may also support more than one processing complexes and/or memories as well as the other functions described above. Furthermore, a root complex 108 may be configured to support a single instance of an operating system executing on multiple processing complexes (e.g., a symmetrical multi-processing operating system), multiple processing complexes executing multiple instances of the same operating system, independent operating systems executing on multiple processing complexes, or independent operating systems executing on multiple processing cores within a single processing complex. For example, devices (e.g., microprocessors) are now being contemplated which have multiple processing cores, each of which are independent of the other (i.e., each processing core has its own memory structure and executes its own operating system independent of other processing cores within the device). Within the context of the PCI Express architecture (which will be further discussed below), a root complex 108 is a component in a PCI Express hierarchy that connects to the HOST bus segment on the upstream side with one or more PCI Express links on the downstream side. In other words, a PCI Express root complex 108 denotes the device that connects a processing complex to the PCI Express fabric. A root complex 108 need not be provided as a stand-alone integrated circuit, but as logic that performs the root complex function which can be integrated into a chipset, or into a processing complex itself. Alternatively, root complex logic may be provided according to the present invention partially integrated within a processing complex with remaining parts integrated within a chipset. The present invention envisions all of these configurations of a root complex 108. In addition, it is noted that although PCI Express is depicted in the present example of a load-store fabric for interconnecting a multi-server computing environment, one skilled in the art will appreciate that other load-store fabric architectures can be applied as well to include RapidIO, VME, HyperTransport, PCI, VME, etc.

The root complex 108 of each of the servers 102, 104, 106 is connected to three I/O controllers 110, 112, 114. For illustration purposes, the I/O controllers 110, 112, 114 are a presented as a Network Interface Controller (NIC) 110, a Fiber Channel Controller 112, and an Other Controller 114. The three controllers 110, 112, 114 allow the root complex 108 of each of the servers 102, 104, 106 to communicate with networks, and data storage systems such as the Ethernet network 128, the Fiber Channel network 130 and the Other network 132. One skilled in the art will appreciate that these networks 128, 130 and 132 may reside within a physical location close in proximity to the servers 102, 104, 106, or may extend to points anywhere in the world, subject to limitations of the network architecture.

To allow each of the servers 102, 104, 106 to connect to the networks 128, 130, 132, switches 122, 124, 126 are provided between the controllers 110, 112, 114 in each of the servers 102, 104, 106, and the networks 128, 130, 132, respectively. That is, an Ethernet switch 122 is connected to the Network Interface Controllers 110 in each of the servers 102, 104, 106, and to the Ethernet network 128. The Ethernet switch 122 allows data or instructions to be transmitted from any device on the Ethernet network 128 to any of the three servers 102, 104, 106, and vice versa. Thus, whatever the communication channel between the root complex 108 and the Network Interface controller 110 (e.g., ISA, EISA, PCI, PCI-X, PCI Express), the Network Interface controller 110 communicates with the Ethernet network 128 (and the Switch 122) utilizing the Ethernet protocol. One skilled in the art will appreciate that the communication channel between the root complex 108 and the network interface controller 110 is within the load-store domain of the root complex 108.

A Fiber Channel switch 124 is connected to the Fiber Channel controllers 112 in each of the servers 102, 104, 106, and to the Fiber Channel network 130. The Fiber Channel switch 124 allows data or instructions to be transmitted from any device on the Fiber Channel network 130 to any of the three servers 102, 104, 106, and vice versa.

An Other switch 126 is connected to the Other controllers 114 in each of the servers 102, 104, 106, and to the Other network 132. The Other switch 126 allows data or instructions to be transmitted from any device on the Other network 132 to any of the three servers 102, 104, 106, and vice versa. Examples of Other types of networks include: Infiniband, SATA, Serial Attached SCSI, etc. While the above list is not exhaustive, the Other network 132 is illustrated herein to help the reader understand that what will ultimately be described below with respect to the present invention, should not be limited to Ethernet and Fiber Channel networks 128, 130, but rather, can easily be extended to networks that exist today, or that will be defined in the future. Further, the communication speeds of the networks 128, 130, 132 are not discussed because one skilled in the art will appreciate that the interface speed of any network may change over time while still utilizing a preexisting protocol.

To illustrate the operation of the environment 100, if the server 102 wishes to send data or instructions over the Ethernet network 128 to either of the servers 104, 106, or to another device (not shown) on the Ethernet network 128, the root complex 108 of the server 102 will utilize its Ethernet controller 110 within the server's load-store domain to send the data or instructions to the Ethernet switch 122 which will then pass the data or instructions to the other server(s) 104, 106 or to a router (not shown) to get to an external device. One skilled in the art will appreciate that any device connected to the Ethernet network 128 will have its own Network Interface controller 110 to allow its root complex to communicate with the Ethernet network.

The present inventors provide the above discussion with reference to FIG. 1 to illustrate that modern computers 102, 104, 106 communicate with each other, and to other computers or devices, using a variety of communication channels 128, 130, 132 or networks. And when more than one computer 102, 104, 106 resides within a particular location, a switch 122, 124, 126 (or logic that executes a switching function) is typically used for each network type to interconnect those computers 102, 104, 106 to each other, and to the network 128, 130, 132. Furthermore, the logic that interfaces a computer 102, 104, 106 to a switch 122, 124, 126 (or to a network 128, 130, 132) is provided within the computer 102, 104, 106. In this example, the servers 102, 104, 106 each have a Network Interface controller 110 to connect to an Ethernet switch 122. They also have a Fiber Channel controller 112 connected to a Fiber Channel switch 124. And they have an Other controller 114 to connect them to an Other switch 126. Thus, each computer 102, 104, 106 is required to include a controller 110, 112, 114 for each type of network 128, 130, 132 it desires to communicate with, to allow its root complex 108 to communicate with that network 128, 130, 132. This allows differing types of processing complexes executing different operating systems, or a processing complex executing multiple operating systems, to communicate with each other because they all have dedicated controllers 110, 112, 114 enabling them to communicate over the desired network 128, 130, 132.

Figure 2A:
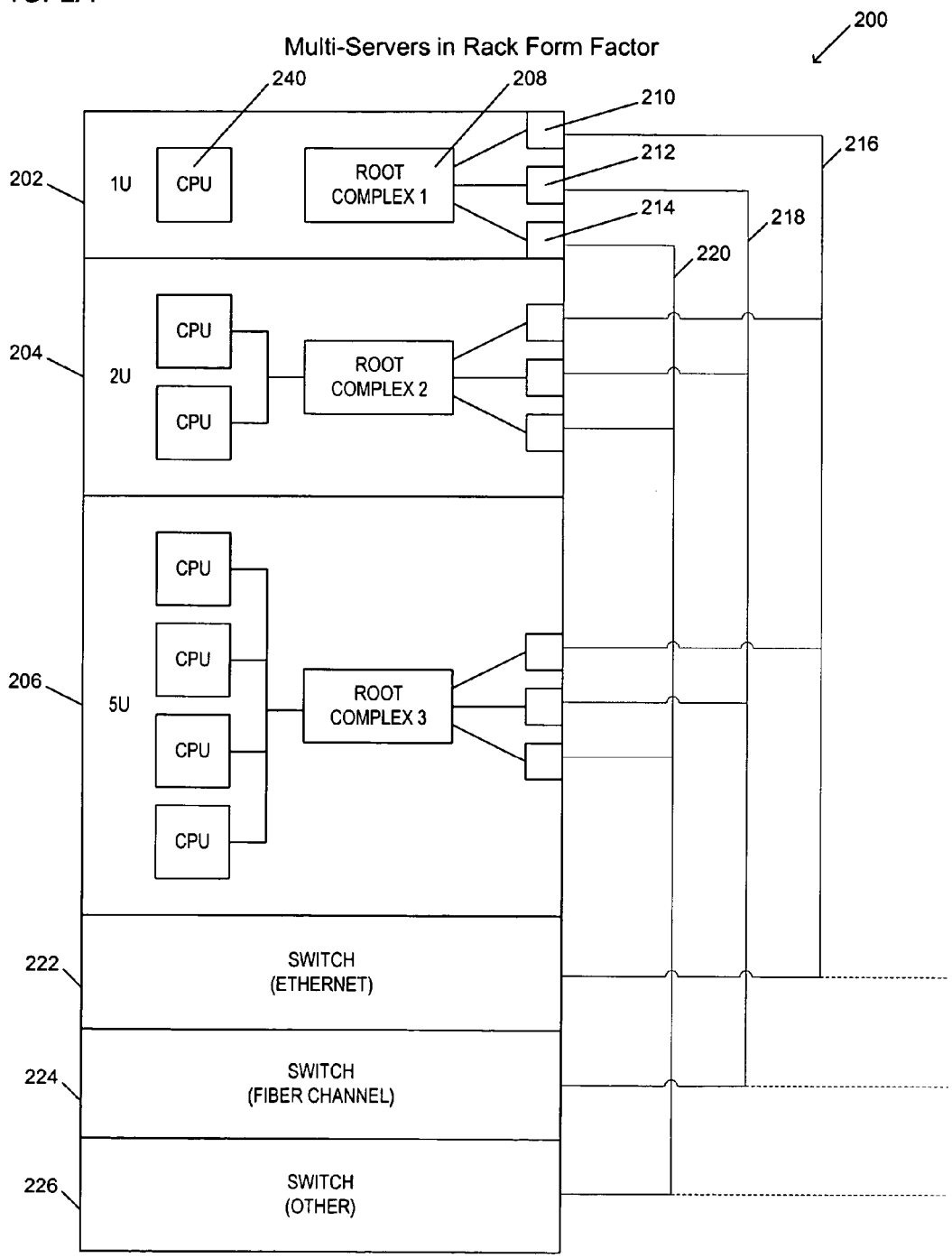
FIG. 2A is an architectural diagram of a computer network of three servers each connected to three different fabrics within a rack form factor.

Referring now to FIG. 2A, a diagram is shown of a multi-server environment 200 similar to the one discussed above with respect to FIG. 1. More specifically, the environment 200 includes three servers 202, 204, 206 each having a root complex 208 and three controllers 210, 212, 214 to allow the servers 202, 204, 206 to connect to an Ethernet switch 222, a Fiber Channel switch 224 and an Other switch 226. However, at least three additional pieces of information are presented in FIG. 2.

First, it should be appreciated that each of the servers 202, 204, 206 is shown with differing numbers of CPU's 240. Within the scope of the present application, a CPU 240 is equivalent to a processing complex as described above. Server 202 contains one CPU 240. Server 204 contains two CPU's 240. Server 206 contains four CPU's 240. Second, the form factor for each of the servers 202, 204, 206 is approximately the same width, but differing height, to allow servers 202, 204, 206 with different computing capacities and executing different operating systems to physically reside within the same rack or enclosure. Third, the switches 222, 224, 226 also have form factors that allow them to be co-located within the same rack or enclosure as the servers 202, 204, 206. One skilled in the art will appreciate that, as in FIG. 1, each of the servers 202, 204, 206 must include within their form factor, an I/O controller 210, 212, 214 for each network with which they desire to communicate. The I/O controller 210, 212, 214 for each of the servers 202, 204, 206 couples to its respective switch 222, 224, 226 via a connection 216, 218, 220 that comports with the specific communication channel architecture provided for by the switch 222, 224, 226

Figure 2B:
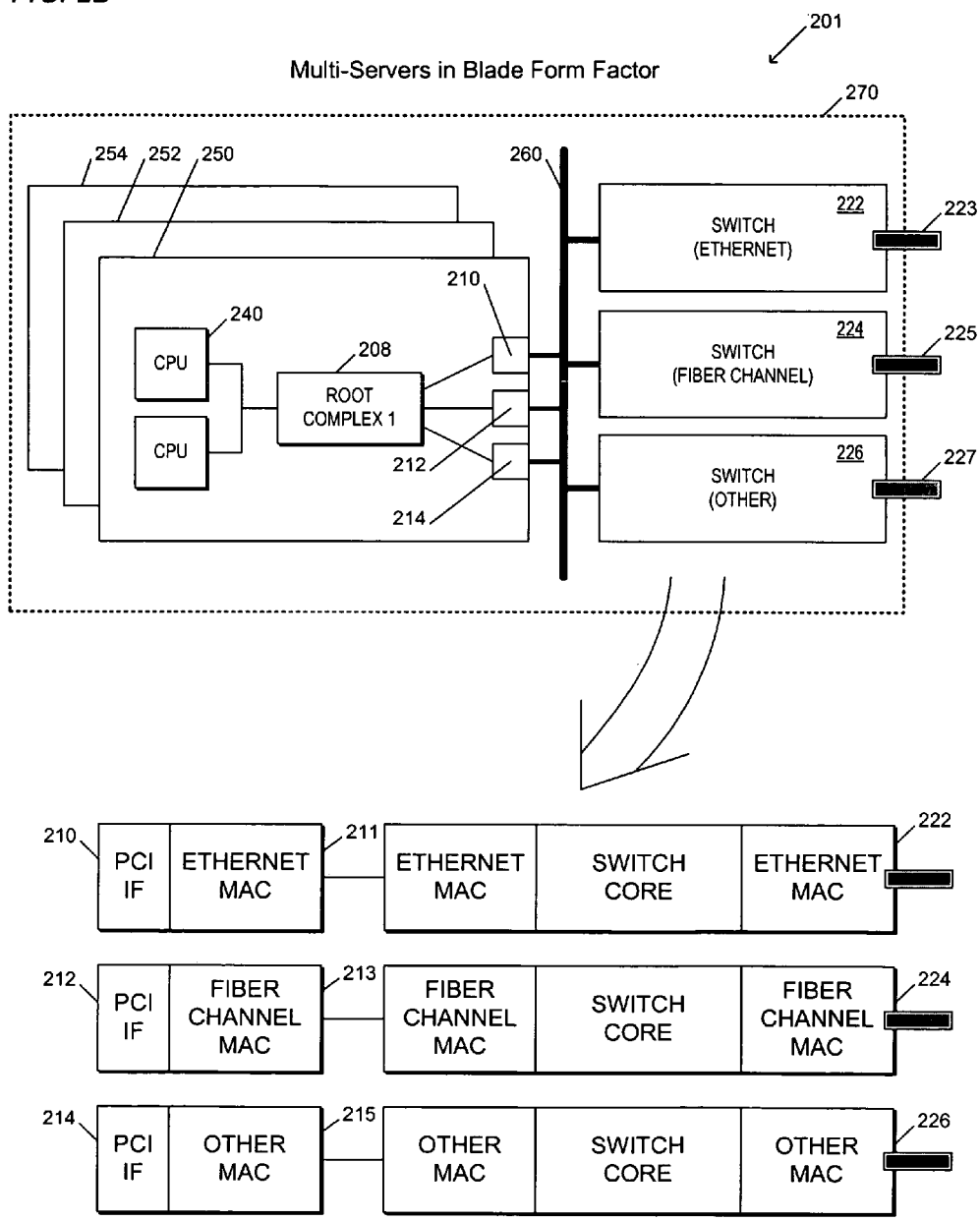
FIG. 2B is an architectural diagram of a computer network of three servers each connected to three different fabrics within a blade form factor.

Now turning to FIG. 2B, a blade computing environment 201 is shown. The blade computing environment 201 is similar to those environments discussed above with respect to FIGS. 1 and 2A, however, each of the servers 250, 252, 254 are physically configured as a single computer board in a form factor known as a blade or a blade server. A blade server 250, 252, 254 is a thin, modular electronic circuit board, containing one or more processing complexes 240 and memory (not shown), that is usually intended for a single, dedicated application (e.g., serving Web pages) and that can be easily inserted into a space-saving rack with other similar servers. Blade configurations make it possible to install hundreds of blade servers 250, 252, 254 in multiple racks or rows of a single floor-standing cabinet. Blade servers 250, 252, 254 typically share a common high-speed bus and are designed to create less heat, thus saving energy costs as well as space. Large data centers and Internet service providers (ISPs) that host Web sites are among companies that use blade servers 250, 252, 254. A blade server 250, 252, 254 is sometimes referred to as a high-density server 250, 252, 254 and is typically used in a clustering of servers 250, 252, 254 that are dedicated to a single task such as file sharing, Web page serving and caching, SSL encrypting of Web communication, transcoding of Web page content for smaller displays, streaming audio and video content, scientific computing, financial modeling, etc. Like most clustering applications, blade servers 250, 252, 254 can also be configured to provide for management functions such as load balancing and failover capabilities. A blade server 250, 252, 254 usually comes with an operating system and the application program to which it is dedicated already on board. Individual blade servers 250, 252, 254 come in various heights, including 5.25 inches (the 3 U model), 1.75 inches (1 U), and possibly "sub-U" sizes. (A "U" is a standard measure of vertical height in an equipment cabinet and is equal to 1.75 inches.)

In the blade environment 201 of FIG. 2B, each of the blade servers 250, 252, 254 has a processing complex comprised of one or more processing cores 240 (i.e., CPUs 240), a root complex 208 (i.e., interface to I/O controllers/devices 210, 212, 214), and onboard I/O controllers 210, 212, 214. The servers 250, 252, 254 are configured to operate within a blade chassis 270 which provides power to the blade servers 250, 252, 254, as well as a backplane interface 260 to that enables the blade servers 250, 252, 254 to communicate with networks 223, 225, 227 via switches 222, 224, 226. In today's blade server market, the switches 222, 224, 226 have a form factor similar to that of the blade servers 250, 252, 254 for insertion into the blade chassis 270.

In addition to showing the servers 250, 252, 254 in a blade form factor along with the switches 222, 224, 226 within a blade chassis 270, the present inventors note that each of the I/O controllers 210, 212, 214 requires logic to interface to the root complex 208 itself and to the specific network media fabric. The logic that provides for interface to the network media fabric is know as Media Access Control (MAC) logic 211, 213, 215. The MAC 211, 213, 215 for each of the I/O controllers 210, 212, 214 typically resides one layer above the physical layer and defines the absolute address of its controller 210, 212, 214 within the media fabric. Corresponding MAC logic is also required on every port of the switches 222, 224, 226 to allow proper routing of data and/or instructions (i.e., usually in packet form) from one port (or device) to another. Thus, within a blade server environment 201, an I/O controller 210, 212, 214 must be supplied on each blade server 250, 252, 254 for each network fabric with which it wishes to communicate. And each I/O controller 210, 212, 214 must include MAC logic 211, 213, 215 to interface the I/O controller 210, 212, 214 to its respective switch 222, 224, 226.

Figure 2C:
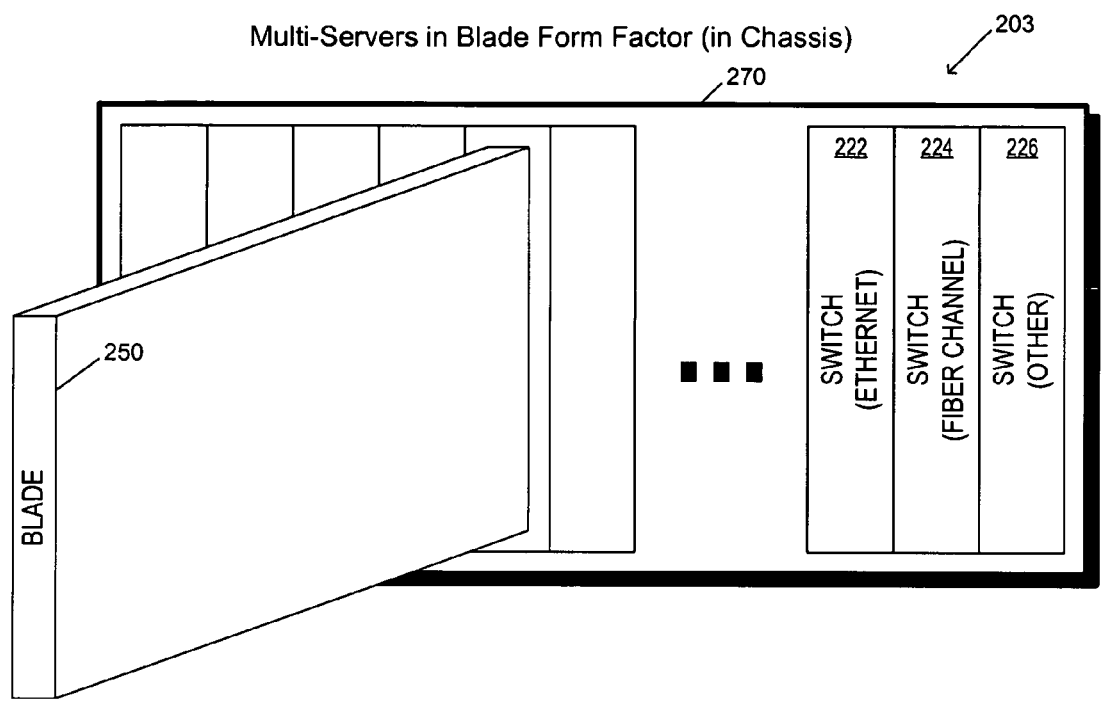
FIG. 2C is a block diagram of a multi-server blade chassis containing switches for three different fabrics.

Turning now to FIG. 2C, a diagram is shown of a blade environment 203. More specifically, a blade chassis 270 is shown having multiple blade servers 250 installed therein. In addition, to allow the blade servers 250 to communicate with each other, and to other networks, blade switches 222, 224, 226 are also installed in the chassis 270. What should be appreciated by one skilled in the art is that within a blade environment 203, to allow blade servers 250 to communicate to other networks, a blade switch 222, 224, 226 must be installed into the chassis 270 for each network with which any of the blade servers 250 desires to communicate. Alternatively, pass-thru cabling might be provided to pass network connections from the blade servers 250 to external switches.

Attention is now directed to FIGS. 3-20. These Figures, and the accompanying text, will describe an invention which allows multiple processing complexes, whether standalone, rack mounted, or blade, to share I/O devices or I/O controllers so that each processing complex does not have to provide its own I/O controller for each network media or fabric to which it is coupled. The invention utilizes a recently developed protocol known as PCI Express in exemplary embodiments, however the present inventors note that although these embodiments are herein described within the context of PCI Express, a number of alternative or yet-to-be-developed load-store protocols may be employed to enable shared I/O controllers/devices without departing from the spirit and scope of the present invention. As has been noted above, additional alternative load-store protocols that are contemplated by the present invention include RapidIO, VME, HyperTransport, PCI, VME, etc.

The PCI architecture was developed in the early 1990's by Intel Corporation as a general I/O architecture to enable the transfer of data and instructions much faster than the ISA architecture of the time. PCI has gone thru several improvements since that time, with the latest development being PCI Express. In a nutshell, PCI Express is a replacement of the PCI and PCI-X bus specification to provide platforms with much greater performance, while using a much lower pin count (Note: PCI and PCI-X are parallel bus architectures; PCI Express is a serial architecture). A complete discussion of PCI Express is beyond the scope of this specification. The present inventors note that a thorough background and description can be found in the following books which are incorporated herein by reference for all intents and purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are readily available through retail sources such as www.amazon.com. In addition, the PCI Express specification itself is managed and disseminated through the Special Interest Group (SIG) for PCI found at www.pcisig.com.

Figure 3:
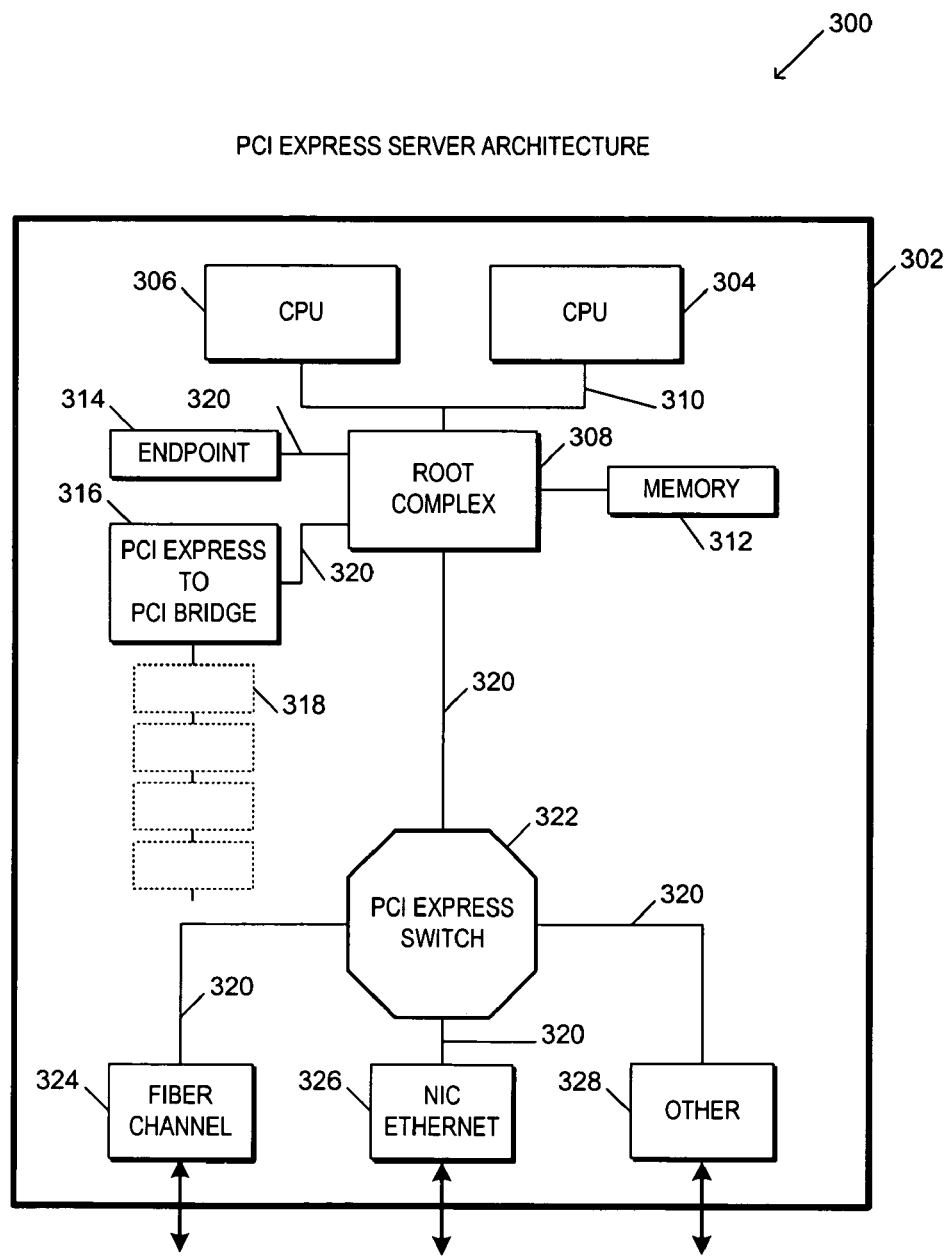
FIG. 3 is an architectural diagram of a computer server utilizing a PCI Express fabric to communicate to dedicated input/output (I/O) endpoint devices.

Referring now to FIG. 3, a diagram 300 is shown illustrating a server 302 utilizing a PCI Express bus for device communication. The server 302 includes CPU's 304, 306 (i.e., processing complexes 304, 306) that are coupled to a root complex 308 via a host bus 310. The root complex 308 is coupled to memory 312, to an I/O endpoint 314 (i.e., an I/O device 314) via a first PCI Express bus 320, to a PCI Express-to-PCI Bridge 316 via a second PCI Express bus 320, and to a PCI Express Switch 322 via a third PCI Express bus 320. The PCI Express-to-PCI Bridge 316 allows the root complex 308 to communicate with legacy PCI devices 318, such as sound cards, graphics cards, storage controllers (SCSI, Fiber Channel, SATA), PCI-based network controllers (Ethernet), Firewire, USB, etc. The PCI Express switch 322 allows the root complex 308 to communicate with multiple PCI Express endpoint devices such as a Fiber Channel controller 324, an Ethernet network interface controller (NIC) 326 and an Other controller 328. Within the PCI Express architecture, an endpoint 314 is any component that is downstream of the root complex 308 or switch 322 and which contains one device with one to eight functions. The present inventors understand this to include devices such as I/O controllers 324, 326, 328, but also comprehend that an endpoint 314 includes devices such as processing complexes that are themselves front ends to I/O controller devices (e.g., xScale RAID controllers).

The server 302 may be either a standalone server, a rack mount server, or a blade server, as shown and discussed above with respect to FIGS. 2A-C, but which includes the PCI Express bus 320 for communication between the root complex 308 and all downstream I/O controllers 324, 326, 328. What should be appreciated at this point is that, even with the advent of PCI Express, a server 302 still requires dedicated I/O controllers 324, 326, 328 to provide the capabilities to interface to network fabrics such as Ethernet, Fiber Channel, etc. In a configuration where the root complex 308 is integrated into one or both of the CPU's 304, 306, the host bus 310 interface from the CPU 304, 306 to the root complex 308 therein may take some other form than that conventionally understood as a host bus 310.

Figure 4:
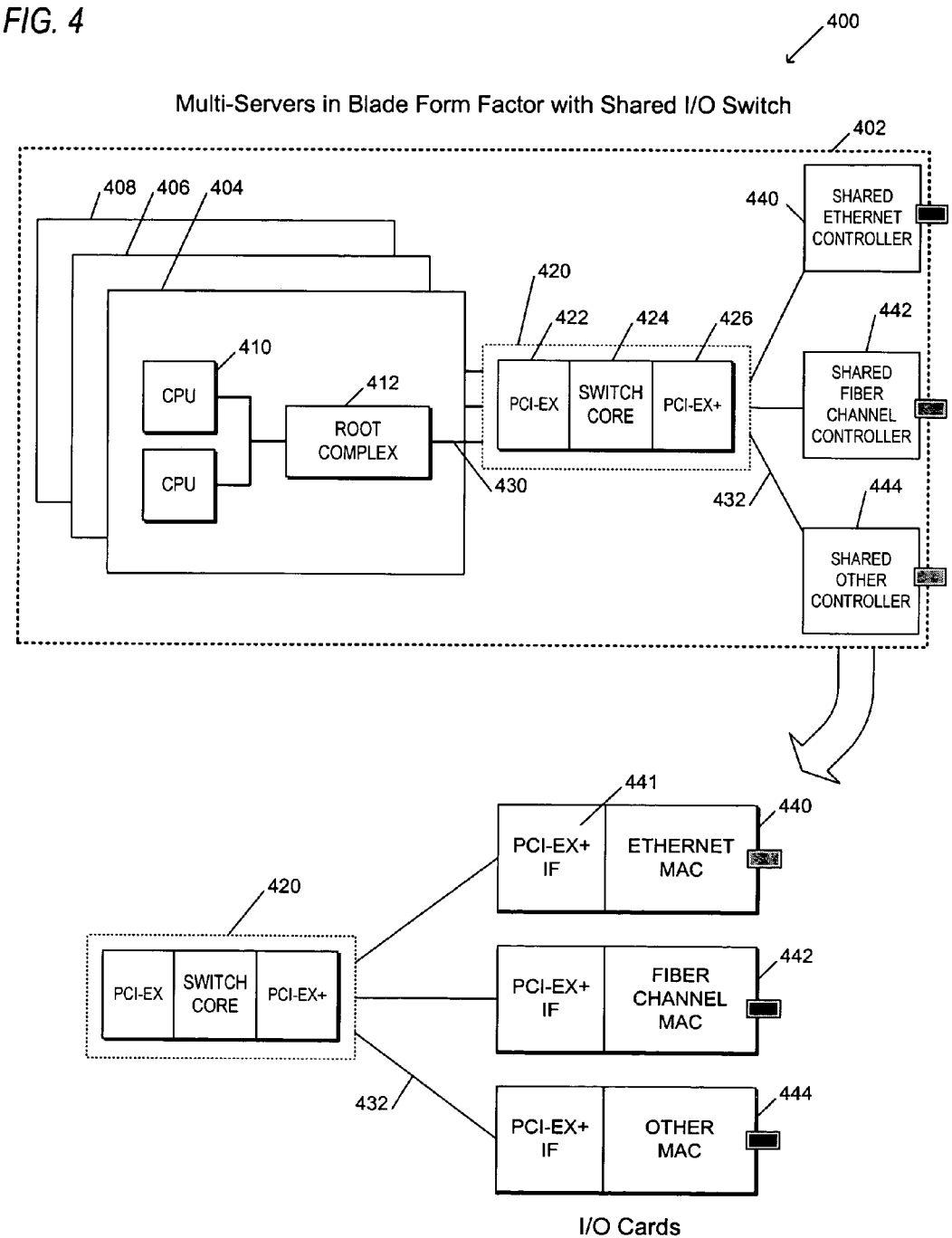
FIG. 4 is an architectural diagram of multiple blade computer servers sharing three different I/O endpoints according to the present invention.

Referring now to FIG. 4, a block diagram is shown of a multi-server environment 400 which incorporates shared I/O innovations according to the present invention. More specifically, three blade servers 404, 406, 408 are shown, each having one or more processing complexes 410 coupled to a root complex 412. On the downstream side of the root complexes 412 associated with each of the servers 404, 406, 408 are PCI Express links 430. The PCI Express links 430 are each coupled to a shared I/O switch 420 according to the present invention. On the downstream side of the shared I/O switch 420 are a number of PCI Express+ links 432 (defined below) coupled directly to shared I/O devices 440, 442, 444. In one embodiment, the shared I/O devices 440, 442, 444 include a shared Ethernet controller 440, a shared Fiber Channel controller 442, and a shared Other controller 444. The downstream sides of each of these shared I/O controllers 440, 442, 444 are connected to their associated network media or fabrics.

In contrast to server configurations discussed above, and as will be further described below, none of the servers 404, 406, 408 has their own dedicated I/O controller. Rather, the downstream side of each of their respective root complexes 412 is coupled directly to the shared I/O switch 420, thus enabling each of the servers 404, 406, 408 to communicate with the shared I/O controllers 440, 442, 444 while still using the PCI Express load-store fabric for communication. As is more particularly shown, the shared I/O switch 420 includes one or more PCI Express links 422 on its upstream side, a switch core 424 for processing PCI Express data and instructions, and one or more PCI Express+ links 432 on its downstream side for connecting to downstream PCI Express devices 440, 442, 444, and even to additional shared I/O switches 420 for cascading of PCI Express+ links 432. In addition, the present invention envisions the employment of multi-function shared I/O devices. A multi-function shared I/O device according to the present invention comprises a plurality of shared I/O devices. For instance, a shared I/O device consisting of a shared Ethernet NIC and a shared I-SCSI device within the same shared i/o endpoint is but one example of a multi-function shared I/O device according to the present invention. Furthermore, each of the downstream shared I/O devices 440, 442, 444 includes a PCI Express+ interface 441 and Media Access Control (MAC) logic. What should be appreciated by one skilled in the art when comparing FIG. 4 to that shown in FIG. 2B is that the three shared I/O devices 440, 442, 444 allow all three servers 404, 406, 408 to connect to the Ethernet, Fiber Channel, and Other networks, whereas the solution of FIG. 2B requires nine controllers (three for each server) and three switches (one for each network type). The shared I/O switch 420 according to the present invention enables each of the servers 404, 406, 408 to initialize their individual PCI Express bus hierarchy in complete transparency to the activities of the other servers 404, 406, 408 with regard to their corresponding PCI Express bus hierarchies. In one embodiment, the shared I/O switch 420 provides for isolation, segregation, and routing of PCI Express transactions to/from each of the servers 404, 406, 408 in a manner that completely complies with existing PCI Express standards. As one skilled in the art will appreciate, the existing PCI Express standards provide for only a single PCI Express bus hierarchy, yet the present invention, as will be further described below, enables multiple PCI Express bus hierarchies to share I/O resources 420, 440, 442, 444 without requiring modifications to existing operating systems. One aspect of the present invention provides the PCI Express+ links 432 as a superset of the PCI Express architecture where information associating PCI Express transactions with a specific processing complex is encapsulated into packets transmitted over the PCI Express+ links 432. In another aspect, the shared I/O switch 424 is configured to detect a non-shared downstream I/O device (not shown) and to communicate with that device in a manner that comports with existing PCI Express standards. And as will be discussed more specifically below, the present invention contemplates embodiments that enable access to shared I/O where the shared I/O switch 424 is physically integrated on a server 404, 406, 408; or where transactions within each of the PCI bus hierarchies associated with each operating system are provided for within the root complex 412 itself. This enables a processing complex 410 to comprise multiple processing cores that each execute different operating systems. The present invention furthermore comprehends embodiments of shared I/O controllers 440, 442, 444 and/or shared I/O devices that are integrated within a switch 420 according to the present invention, or a root complex 412 according to the present invention, or a processing core itself that provides for sharing of I/O controllers/devices as is herein described. The present inventors note that although the exemplary multi-server environment 400 described above depicts a scenario where none of the servers 404, 406, 408 has its own dedicated I/O controller, such a configuration is not precluded by the present invention. For example, it the present invention contemplates the a root complex 412 having multiple PCI Express links 430 wherein one or more of the PCI Express links 430 is coupled to a shared I/O switch 420 as shown, and where others of the PCI Express links 430 are each coupled to a non-shared PCI Express-based I/O device (not shown). Although the example of FIG. 4 is depicted in terms of a PCI Express-based architecture for sharing of I/O devices 440, 442, 444, the present invention is also applicable to other load-store architectures as well to include RapidIO, HyperTransport, VME, PCI, etc.

Figure 5:
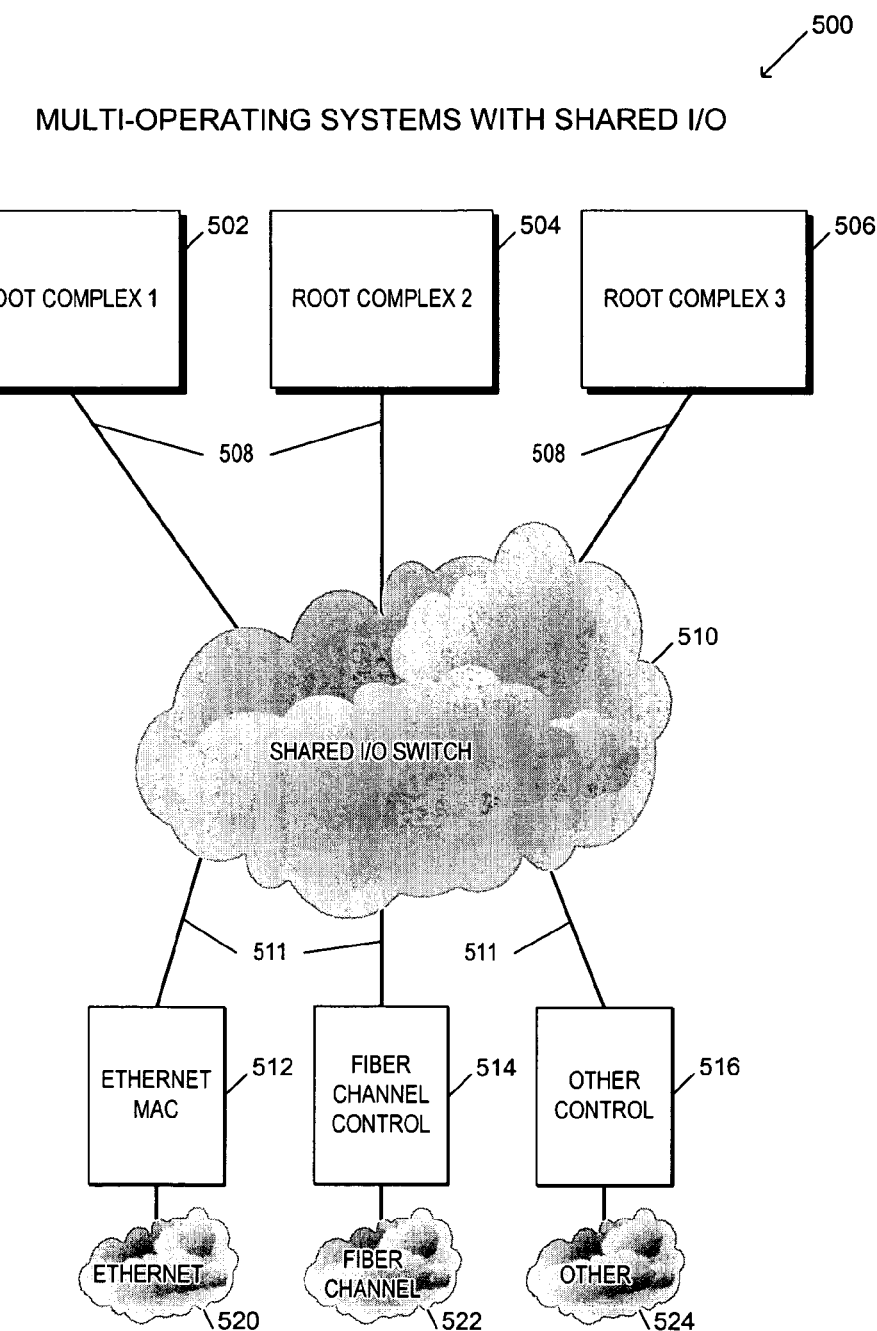
FIG. 5 is an architectural diagram illustrating three root complexes sharing three different I/O endpoint devices through a shared I/O switch according to the present invention.

Turning now to FIG. 5, a block diagram of a shared I/O environment 500 is shown which incorporates the novel aspects of the present invention. More specifically, the shared I/O environment 500 includes a plurality of root complexes 502, 504, 506, each coupled to a shared I/O switch 510 via one or more PCI Express links 508. For clarity of discussion, it is noted that the root complexes 502 discussed below are coupled to one or more processing complexes (not shown) that may or may not include their own I/O devices (not shown). As mentioned above, reference to PCI Express is made for illustration purposes only as an exemplary load-store architecture for enabling shared I/O according to the present invention. Alternative embodiments include other load-store fabrics, whether serial or parallel.

The shared I/O switch 510 is coupled to a shared Ethernet controller 512, a shared Fiber Channel controller 514, and a shared Other controller 516 via PCI Express+ links 511 according to the present invention. The shared Ethernet controller 512 is coupled to an Ethernet fabric 520. The shared Fiber Channel controller 514 is coupled to a Fiber Channel fabric 522. The shared Other controller 516 is coupled to an Other fabric 524. In operation, any of the root complexes 502, 504, 506 may communicate with any of the fabrics 520, 522, 524 via the shared I/O switch 510 and the shared I/O controllers 512, 514, 516. Specifics of how this is accomplished will now be described with reference to FIGS. 6-20.

Figure 6:
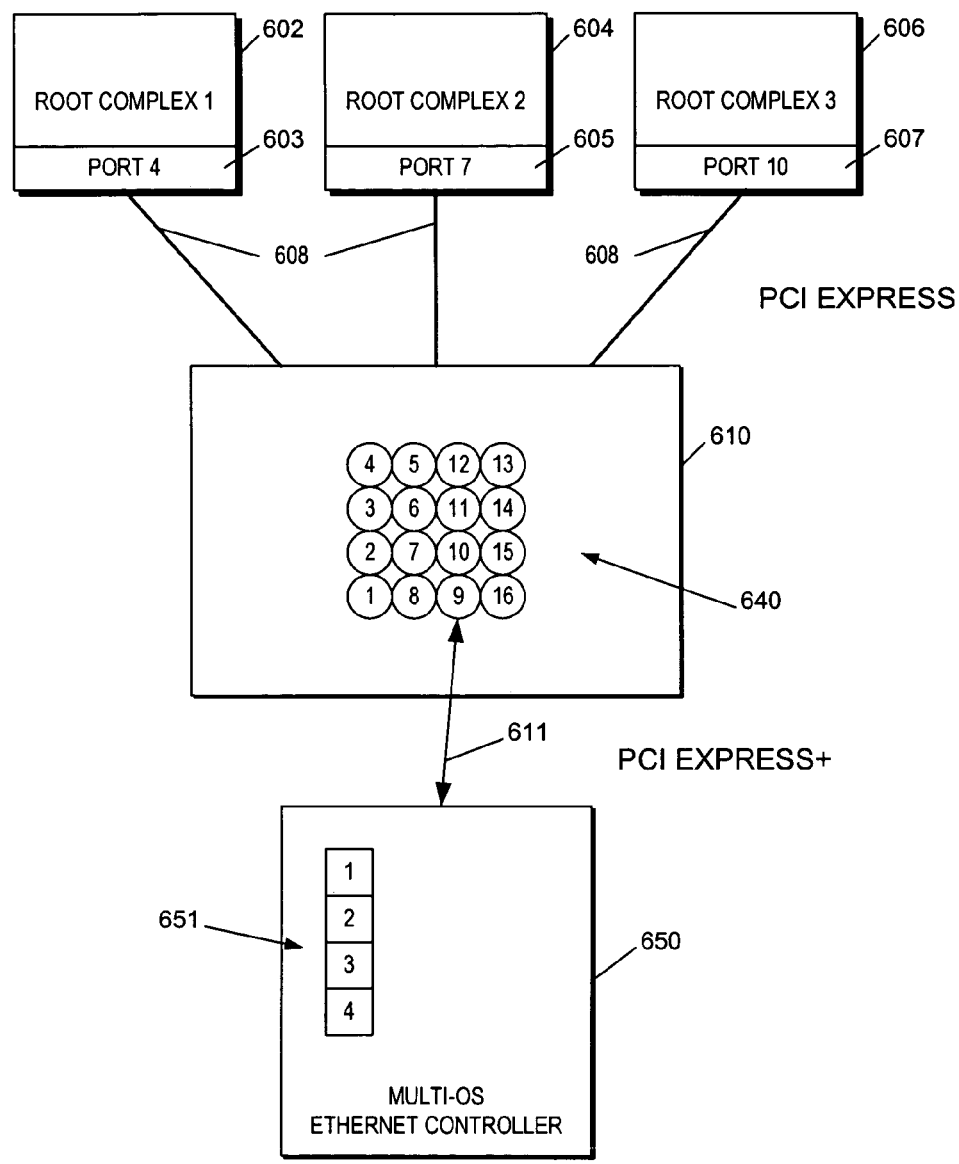
FIG. 6 is an architectural diagram illustrating three root complexes sharing a multi-OS Ethernet Controller through a multi-port shared I/O switch according to the present invention.

Referring to FIG. 6, a block diagram of a computing environment 600 is shown illustrating a shared I/O embodiment according to the present invention. The computing environment includes three root complexes 602, 604, 606. The root complexes 602, 604, 606 are each associated with one or more processing complexes (not shown) that are executing a single instance of an SMP operating system, multiple instances of an operating system, or multiple instances of different operating systems. What each of the processing complexes have in common is that they each interface to a load-store fabric such as PCI Express through their root complexes 602, 604, 606. For purposes of illustration, the complexes 602, 604, 606 each have a port 603, 605, 607 which interfaces them to a PCI Express link 608.

In the exemplary environment embodiment 600, each of the ports 603, 605, 607 are coupled to one of 16 ports 640 within a shared I/O switch 610 according to the present invention. In one embodiment, the switch 610 provides 16 ports 640 which support shared I/O transactions via the PCI Express fabric, although other port configurations are contemplated. One skilled in the art will appreciate that these ports 640 may be of different speeds (e.g., 2.5 Gb/sec) and may support multiple PCI Express or PCI Express+ lanes per link 608, 611 (e.g., ×1, ×2, ×4, ×8, ×12, ×16). For example, port 4 603 of root complex 1 602 may be coupled to port 4 of I/O switch 610, port 7 605 of root complex 2 604 may be coupled to port 11 of I/O switch 610, and port 10 607 of root complex 3 606 may be coupled to port 16 of switch 610.

On the downstream side of the switch 610, port 9 of may be coupled to a port (not shown) on a shared I/O controller 650, such as the shared Ethernet controller 650 shown, that supports transactions from one of N different operating system domains via corresponding root complexes 602, 604, 606. Illustrated within the shared I/O controller 650 are four OS resources 651 that are independently supported. That is, the shared I/O controller 650 is capable of transmitting, receiving, isolating, segregating, and processing transactions from four distinct root complexes that are associated with four operating system (OS) domains. An OS domain, within the present context, is a system load-store memory map that is associated with one or more processing complexes. Typically, present day operating systems such as Windows, Unix, Linux, VxWorks, etc., must comport with a specific load-store memory map that corresponds to the processing complex upon which they execute. For example, a typical x86 load-store memory map provides for both memory space and I/O space. Conventional memory is mapped to the lower 640 kilobytes (KB) of memory. The next higher 128 KB of memory are employed by legacy video devices. Above that is another 128 KB block of addresses mapped to expansion ROM. And the 128 KB block of addresses below the 1 megabyte (MB) boundary is mapped to boot ROM (i.e., BIOS). Both DRAM space and PCI memory are mapped above the 1 MB boundary. Accordingly, two separate processing complexes may be executing within two distinct OS domains, which typically means that the two processing complexes are executing either two instances of the same operating system or that they are executing two distinct operating systems. However, in a symmetrical multi-processing environment, a plurality of processing complexes may together be executing a single instance of an SMP operating system, in which case the plurality of processing complexes would be associated with a single OS domain. In one embodiment, the link 611 between the shared I/O switch 610 and the shared I/O controller 650 utilizes the PCI Express fabric, but enhances the fabric to allow for identification and segregation of OS domains, as will be further described below. The present inventors refer to the enhanced fabric as "PCI Express+."

Figure 7:
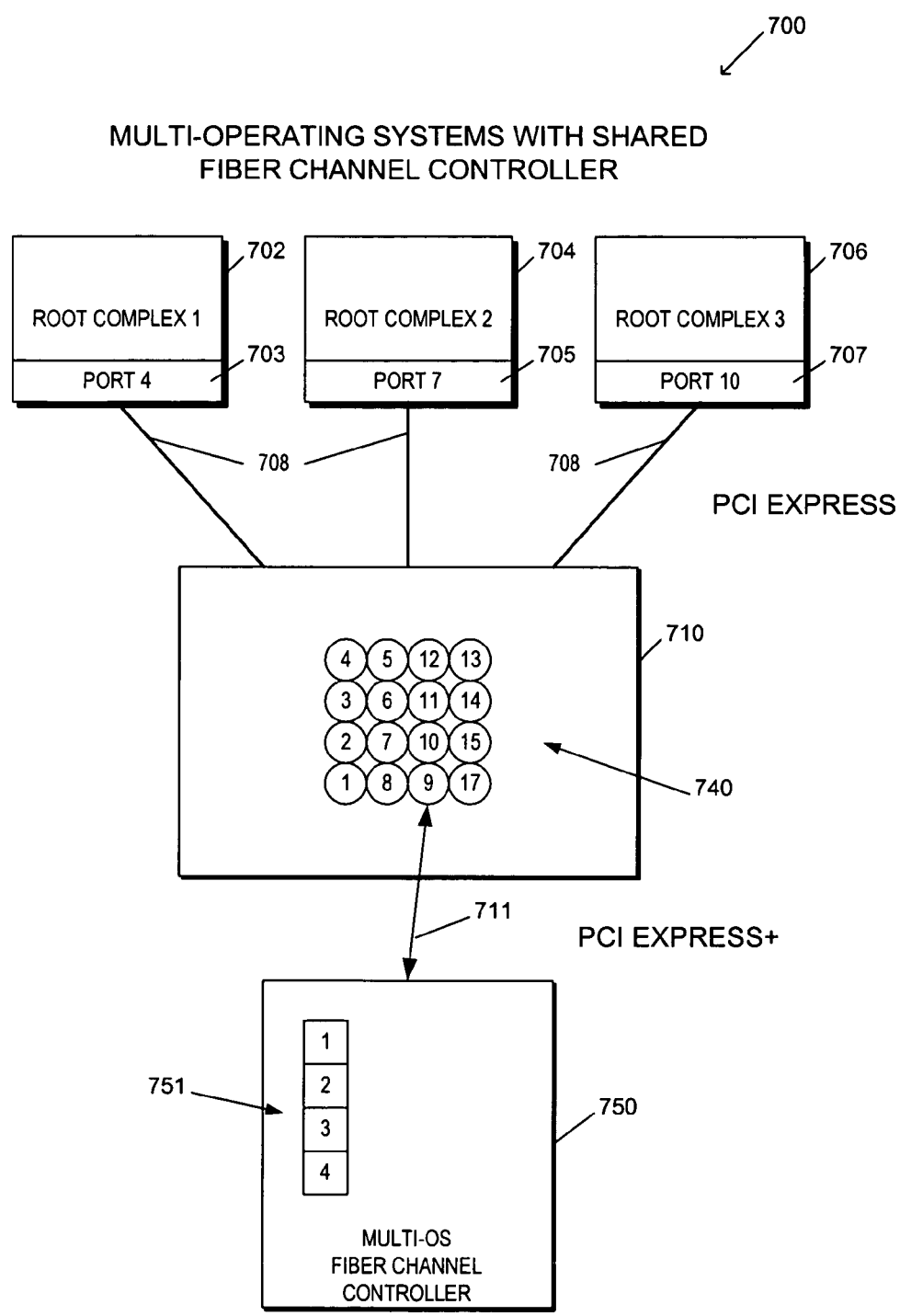
FIG. 7 is an architectural diagram illustrating three root complexes sharing a multi-OS Fiber Channel Controller through a multi-port shared I/O switch according to the present invention.

Referring now to FIG. 7, an architecture 700 is shown which illustrates an environment similar to that described above with reference to FIG. 6, the hundreds digit being replaced by a "7". However, in this example, three root complexes 702, 704, 706 are coupled to a shared I/O Fiber Channel controller 750 through the shared I/O switch 710. In one embodiment, the shared I/O Fiber Channel controller 750 is capable of supporting transactions corresponding to up to four independent OS domains 751. Additionally, each of the root complexes 702, 704, 706 maintain their one-to-one port coupling to the shared I/O switch 710, as in FIG. 6. That is, while other embodiments allow for a root complex 702, 704, 706 to have multiple port attachments to the shared I/O switch 710, it is not necessary in the present embodiment. For example, the root complex 1 702 may communicate through its port 4 703 to multiple downstream I/O devices, such as the Ethernet controller 650, and the Fiber Channel controller. 750. This aspect of the present invention enables root complexes 702, 704, 706 to communicate with any shared I/O controller that is attached to the shared I/O switch 710 via a single PCI Express port 703, 705, 707.

Figure 8:
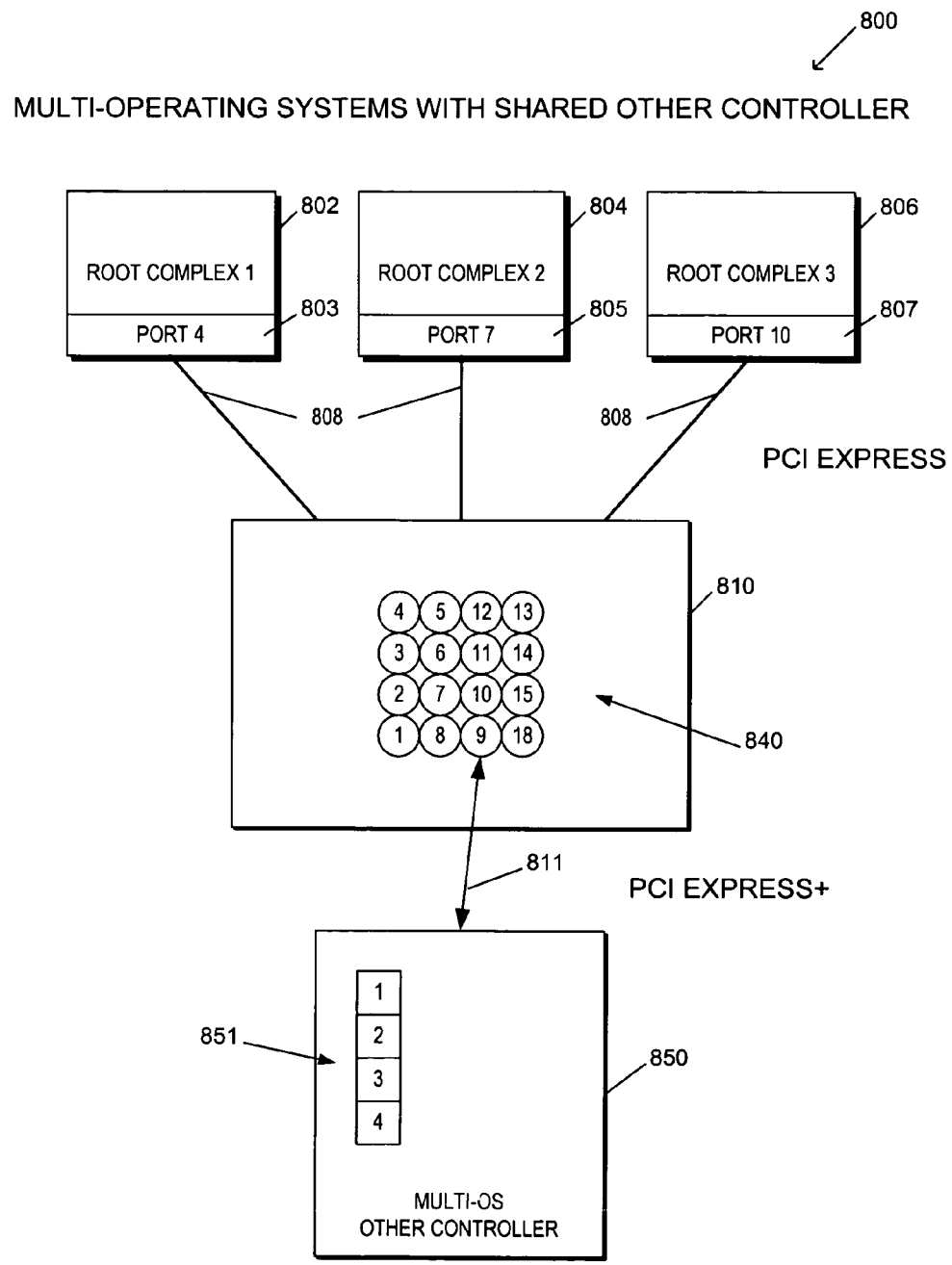
FIG. 8 is an architectural diagram illustrating three root complexes sharing a multi-OS Other Controller through a multi-port shared I/O switch according to the present invention.

Referring now to FIG. 8, an architecture 800 is shown which illustrates an environment similar to that described above with reference to FIGS. 6-7, the hundreds digit being replaced by an "8". However, in this example, three root complexes 802, 804, 806 are coupled to a shared I/O Other controller 850 (supporting transactions corresponding with up to four independent OS domains 851) through the shared I/O switch 810. In one aspect, the shared I/O Other controller 850 may be embodied as a processing complex itself that is configured for system management of the shared I/O switch 810. As noted above, it is envisioned that such an I/O controller 850 may be integrated within the shared I/O switch 810, or within one of the root complexes 802, 804, 806. Moreover, it is contemplated that any or all of the three controllers 650, 750, 850 shown in FIGS. 6-8 may be integrated within the shared I/O switch 810 without departing from the spirit and scope of the present invention. Alternative embodiments of the share I/O other controller 850 contemplate a shared serial ATA (SATA) controller, a shared RAID controller, or a shared controller that provides services comporting with any of the aforementioned I/O device technologies.

Figure 9:
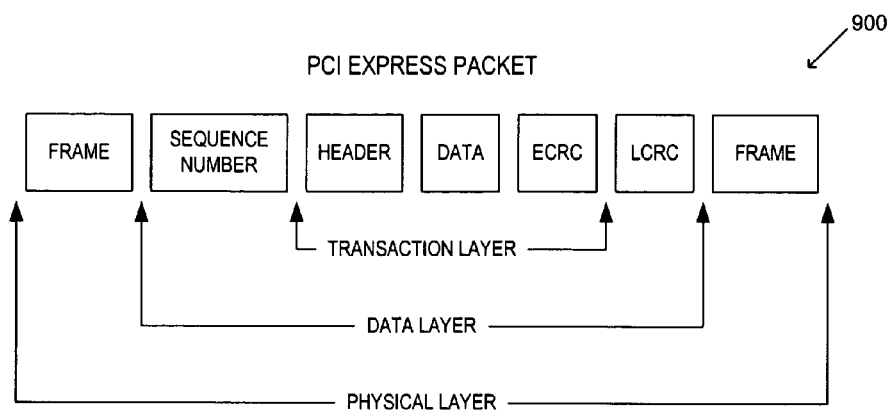
FIG. 9 is a block diagram of a prior art PCI Express Packet.

Turning now to FIG. 9, a block diagram of a PCI Express packet 900 is shown. The details of each of the blocks in the PCI Express packet 900 are thoroughly described in the *PCI Express Base Specification* 1.0a published by the PCI Special Interest Group (PCI-SIG), 5440 SW Westgate Dr. #217, Portland, Oreg., 97221 (Phone: 503-291-2569). The specification is available online at URL htt://www.pcisig.com. The *PCI Express Base Specification* 1.0a is incorporated herein by reference for all intents and purposes. In addition, it is noted that the *PCI Express Base Specification* 1.0a references additional errata, specifications, and documents that provide further details related to PCI Express. Additional descriptive information on PCI Express may be found in the texts referenced above with respect to FIG. 2C.

In one embodiment, the packet structure 900 of PCI Express, shown in FIG. 9, is utilized for transactions between root complexes 602, 604, 606 and the shared I/O switch 610. However, the present invention also contemplates that the variant of PCI Express described thus far as PCI Express+ may also be employed for transactions between the root complexes 602, 604, 606 and the shared I/O switch 610, or directly between the root complexes 602-606 and downstream shared I/O endpoints 650. That is, it is contemplated that OS domain isolation and segregation aspects of the shared I/O switch 610 may eventually be incorporated into logic within a root complex 602, 604, 606 or a processing complex. In this context, the communication between the root complex 602, 604, 606 or processing complex and the incorporated "switch" or sharing logic may be PCI Express, while communication downstream of the incorporated "switch" or sharing logic may be PCI Express+. In another embodiment of integrated sharing logic within a root complex 602, 604, 606, the present inventors contemplate sharing logic (not shown) within a root complex 602, 604, 606 to accomplish the functions of isolating and segregation transactions associated with one or more OS domains, where communication between the root complex 602, 604, 606 and the associated processing complexes occurs over a HOST bus, and where downstream transactions to shared I/O devices 650 or additional shared I/O switches 610 are provided as PCI Express+ 611. In addition, the present inventors conceive that multiple processing complexes may be incorporated together (such as one or more independent processing cores within a single processor), where the processing cores are shared I/O aware (i.e., they communicate downstream to a shared I/O endpoint 650 or shared I/O switch 610—whether integrated or not—using PCI Express+ 611).

Figure 10:
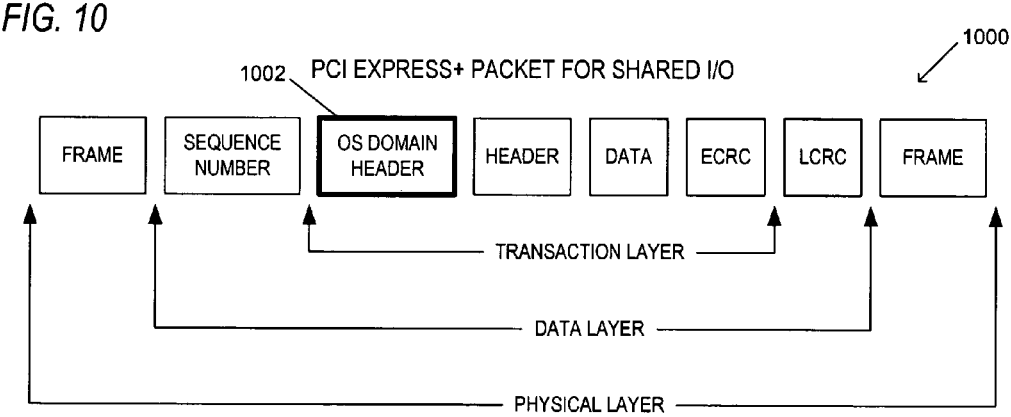
FIG. 10 is a block diagram of a PCI Express+ packet for accessing a shared I/O controller/device according to the present invention.

Referring now to FIG. 10, a block diagram of a PCI Express+ packet 1000 is shown. More specifically, the PCI Express+ packet 1000 includes an OS domain header 1002 encapsulated within a transaction layer sub-portion of the PCI Express packet 900 of FIG. 9. The PCI Express+ packet 1000 is otherwise identical to a conventional PCI Express packet 900, except for encapsulation of the OS domain header 1002 which designates that the associated PCI Express transaction is to be associated with a particular OS domain. According to the present invention, an architecture is provided that enables multiple OS domains to share I/O switches, I/O controllers, and/or I/O devices over a single fabric that would otherwise provide only for transactions associated with a single OS domain (i.e., load-store domain). By encapsulating the OS domain header 1002 into downstream packets 1000—whether generated by a shared I/O switch, a shared I/O aware root complex, or a shared I/O aware processing complex—a transaction can be designated for a specific OS domain. In one embodiment, a plurality of processing complexes is contemplated, where the plurality of processing complexes each correspond to separate legacy OS domains whose operating systems are not shared I/O aware. According to this embodiment, legacy operating system software is employed to communicate transactions with a shared I/O endpoint or shared I/O switch, where the OS domain header 1002 is encapsulated/decapsulated by a shared I/O aware root complex and the shared I/O endpoint, or by a shared I/O switch and the shared I/O endpoint. It is noted that the PCI Express+ packet 1000 is only one embodiment of a mechanism for identifying, isolating, and segregating transactions according to operating system domains within a shared I/O environment. PCI Express is a useful load-store architecture for teaching the present invention because of its wide anticipated use within the industry. However, one skilled in the art should appreciate that the association of load-store transactions with operating system domains within a shared I/O environment can be accomplished in other ways according to the present invention. For example, a set of signals designating operating system domain can be provided on a bus, or current signals can be redefined to designate operating system domain. Within the existing PCI architecture, one skilled might redefine an existing field (e.g., reserved device ID field) to designate an operating system domain associated with a particular transaction. Specifics of the OS domain header 1002 are provided below in FIG. 11, to which attention is now directed.

Figure 11:
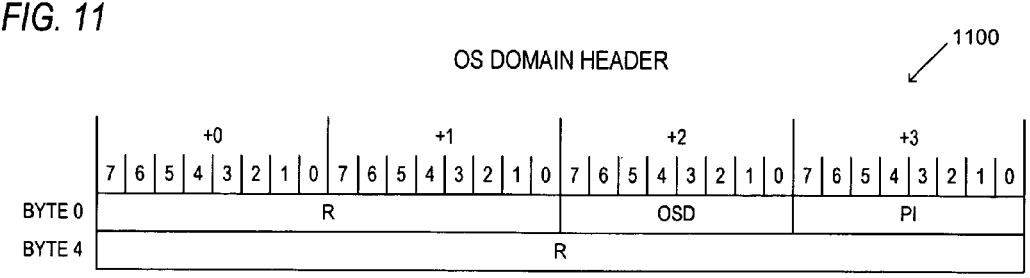
FIG. 11 is a detailed view of an OS (Operating System) Domain header within the PCI Express+ packet of FIG. 10, according to the present invention.

FIG. 11 illustrates one embodiment of an OS domain header 1100 which is encapsulated within a PCI Express packet 900 to generated a PCI Express+ packet 1000. The OS domain header 1100 is decapsulated from a PCI Express+ packet 1000 to generate a PCI Express packet 900. In one embodiment, the OS domain header 1100 comprises eight bytes which includes 6 bytes that are reserved (R), one byte allocated as a Protocol ID field (PI), and eight bits allocated to designating an OS domain number (OSD). The OSD is used to associate a transaction packet with its originating or destination operating system domain. An 8-bit OSD field is thus capable of identifying 256 unique OS domains to a shared I/O endpoint device, a shared I/O aware root complex or processing complex, or a shared I/O switch according to the present invention. Although an 8-bit OS domain number field is depicted in the OS domain header 1100 of FIG. 11, one skilled in the art will appreciate that the present invention should not be restricted to the number of bits allocated within the embodiment shown. Rather, what is important is that a means of associating a shared transaction with its origin or destination OS domain be established to allow the sharing and/or partitioning of I/O controllers/devices.

In an alternative embodiment, the OS domain number is used to associate a downstream or upstream port with a PCI Express+ packet. That is, where a packet must traverse multiple links between its origination and destination, a different OSD may be employed for routing of a given packet between a port pair on a given link than is employed for routing of the packet between an port pair on another link. Although different OS domain numbers are employed within the packet when traversing multiple links, such an aspect of the present invention still provides for uniquely identifying the packet so that it remains associated with its intended OS domain.

Additionally, within the OS domain header 1100, are a number of reserved (R) bits. It is conceived by the present inventors that the reserved bits have many uses. Accordingly, one embodiment of the present invention employs one or more of the reserved bits to track coherency of messages within a load-store fabric. Other uses of the reserved bits are contemplated as well. For example, one embodiment envisions use of the reserved (R) bits to encode a version number for the PCI Express+ protocol that is associated with one or more corresponding transactions.

In an exemplary embodiment, a two level table lookup is provided. More specifically, an OS domain number is associated with a PCI Express bus hierarchy. The PCI bus hierarchy is then associated with a particular upstream or downstream port. In this embodiment, normal PCI Express discovery and addressing mechanisms are used to communicate with downstream shared I/O switches and/or shared I/O devices. Accordingly, sharing logic within a shared I/O switch 610 (or shared I/O aware root complex or processing complex) maps particular PCI bus hierarchies to particular shared I/O endpoints 650 to keep multiple OS domains from seeing more shared I/O endpoints 650 than have been configured for them by the shared I/O switch 610. All variations which associate a transaction packet with an OS domain are contemplated by the present invention.

In a PCI Express embodiment, the OS domain header 1100 may be the only additional information included within a PCI Express packet 900 to form a PCI Express+ packet 1000. Alternatively, the present invention contemplates other embodiments for associating transactions with a given OS domain. For instance, a "designation" packet may be transmitted to a shared I/O device that associates a specified number of following packets with the given OS domain.

In another embodiment, the contents of the OS domain header 1100 are first established by the shared I/O switch 610 by encapsulating the port number of the shared I/O switch 610 that is coupled to the upstream root complex 602, 604, 606 from which a packet originated, or for which a packet is intended, as the OSD. But other means of associating packets with their origin/destination OS domain are contemplated. One alternative is for each root complex 602, 604, 606 that is coupled to the shared I/O switch 610 to be assigned a unique ID by the shared I/O switch 610 to be used as the OSD. Another alternative is for a root complex 602, 604, 606 to be assigned a unique ID, either by the shared I/O switch 610, or by any other mechanism within or external to the root complex 602, 604, 606, which is then used in packet transfer to the shared I/O switch (or downstream shared I/O controllers).

Figure 12:
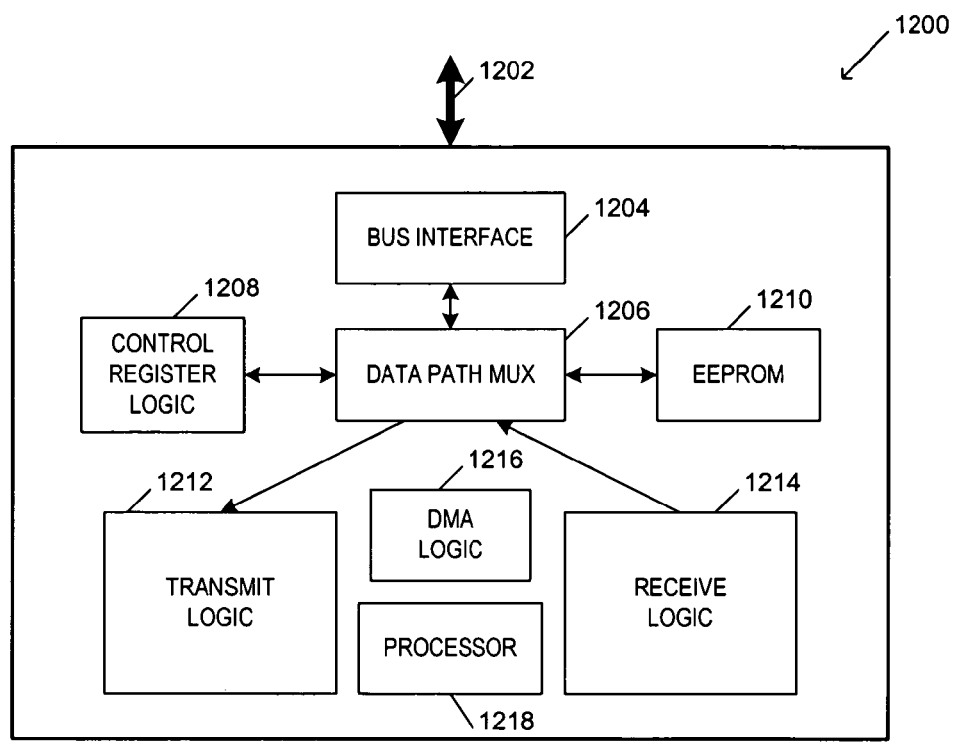
FIG. 12 is an architectural diagram of a prior art Ethernet Controller.

Turning now to FIG. 12, a high level block diagram is shown of a prior art non-shared Ethernet controller 1200. The non-shared Ethernet controller 1200 includes a bus interface 1204 for coupling to a bus 1202 (such as PCI, PCI-X, PCI Express, etc.). The bus interface 1204 is coupled to a data path multiplexer (MUX) 1206. The MUX 1206 is coupled to control register logic 1208, EEPROM 1210, transmit logic 1212, and receive logic 1214. Also included within the non-shared Ethernet controller 1200 are DMA logic 1216 and a processor 1218. One familiar with the logic within a non-shared Ethernet controller 1200 will appreciate that they include: 1) the bus interface 1204 which is compatible with whatever industry standard bus they support, such as those listed above; 2) a set of control registers 1208 which allow the controller 1200 to communicate with whatever server (or root complex, or OS domain) to which it is directly attached; 3) and DMA logic 1216 which includes a DMA engine to allow it to move data to/from a memory subsystem that is associated with the root complex to which the non-shared Ethernet controller 1200 is attached.

Figure 13:
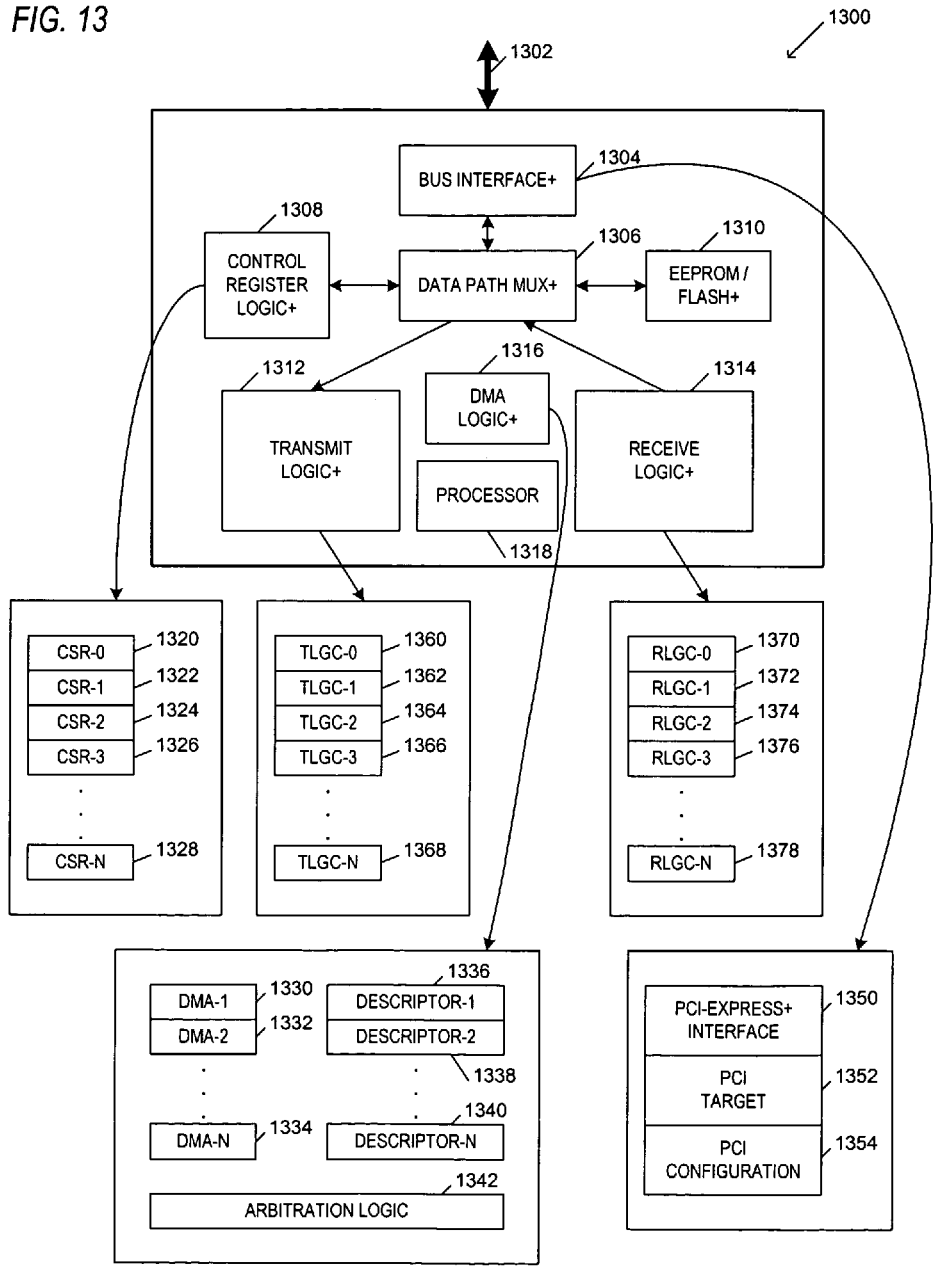
FIG. 13 is an architectural diagram of a shared Ethernet Controller according to the present invention.

Turning to FIG. 13, a block diagram is provided of an exemplary shared Ethernet Controller 1300 according to the present invention. It is noted that a specific configuration of elements within the exemplary shared Ethernet Controller 1300 are depicted to teach the present invention. But one skilled in the art will appreciate that the scope of the present invention should not be restricted to the specific configuration of elements shown in FIG. 13. The shared Ethernet controller 1300 includes a bus interface+ 1304 for coupling the shared Ethernet controller 1300 to a shared load-store fabric 1302 such as the PCI Express+ fabric described above. The bus interface+ 1304 is coupled to a data path mux+ 1306. The data path mux+ 1306 is coupled to control register logic+ 1308, an EEPROM/Flash+ 1310, transmit logic+ 1312 and receive logic+ 1314. The shared Ethernet controller 1300 further includes DMA logic+ 1316 and a processor 1318.

More specifically, the bus interface+ 1304 includes: an interface 1350 to a shared I/O fabric such as PCI Express+; PCI Target logic 1352 such as a table which associates an OS domain with a particular one of N number of operating system domain resources supported by the shared I/O controller 1300; and PCI configuration logic 1354 which, in one embodiment, controls the association of the resources within the shared I/O controller 1300 with particular OS domains. The PCI configuration logic 1354 enables the shared Ethernet Controller 1300 to be enumerated by each supported OSD. This allows each upstream OS domain that is mapped to the shared I/O controller 1300 to view it as an I/O controller having resources that are dedicated to its OS domain. And, from the viewpoint of the OS domain, no changes to the OS domain application software (e.g., operating system, driver for the controller, etc.) are required because the OS domain communicates transactions directed to the shared I/O controller using its existing load-store protocol (e.g., PCI Express). When these transactions reach a shared I/O aware device, such as a shared I/O aware root complex or shared I/O switch, then encapsulation/decapsulation of the above-described OS domain header is accomplished within the transaction packets to enable association of the transactions with assigned resources within the shared I/O controller 1300. Hence, sharing of the shared I/O controller 1300 between multiple OS domains is essentially transparent to each of the OS domains.

The control register logic+ 1308 includes a number of control register sets 1320-1328, each of which may be independently associated with a distinct OS domain. For example, if the shared I/O controller 1300 supports just three OS domains, then it might have control register sets 1320, 1322, 1324 where each control register set 1320, 1322, 1324 is associated with one of the three OS domains. Thus, transaction packets associated with a first OS domain would be associated with control register set 1320, transaction packets associated with a second OS domain would be associated with control register set 1322, and transaction packets associated with a third OS domain would be associated with control register set 1324. In addition, one skilled in the art will appreciate that while some control registers within a control register set (such as 1320) need to be duplicated within the shared I/O controller 1300 to allow multiple OS domains to share the controller 1300, not all control registers require duplication. That is, some control registers must be duplicated for each OS domain, others can be aliased, while others may be made accessible to each OS domain. What is illustrated in FIG. 13 is N control register sets, where N is selectable by the vender of the shared I/O controller 1300, to support as few, or as many independent OS domains as is desired.

The transmit logic+ 1312 includes a number of transmit logic elements 1360-1368, each of which may be independently associated with a distinct OS domain for transmission of packets and which are allocated in a substantially similar manner as that described above regarding allocation of the control register sets 1320-1328. In addition, the receive logic+ 1314 includes a number of receive logic elements 1370-1378, each of which may be independently associated with a distinct OS domain for reception of packets and which are allocated in a substantially similar manner as that described above regarding allocation of the control register sets 1320-1328. Although the embodiment of the shared Ethernet Controller 1300 depicts replicated transmit logic elements 1360-1360 and replicated receive logic elements 1370-1378, one skilled in the art will appreciate that there is no requirement to replicate these elements 1360-1368, 1370-1378 in order to embody a shared Ethernet controller 1300 according to the present invention. It is only necessary to provide transmit logic+ 1312 and receive logic+ 1314 that are capable of transmitting and receiving packets according to the present invention in a manner that provides for identification, isolation, segregation, and routing of transactions according to each supported OS domain. Accordingly, one embodiment of the present invention contemplates transmit logic+ 1312 and receive logic+ 1314 that does not comprise replicated transmit or receive logic elements 1360-1368, 1370-1378, but that does provide for the transmission and reception of packets as noted above.

The DMA logic+ 1316 includes N DMA engines 1330, 1332, 1334; N Descriptors 1336, 1338, 1340; and arbitration logic 1342 to arbitrate utilization of the DMA engines 1330-1334. That is, within the context of a shared I/O controller 1300 supporting multiple OS domains, depending on the number of OS domains supported by the shared I/O controller 1300, performance is improved by providing multiple DMA engines 1330-1334, any of which may be utilized at any time by the controller 1300, for any particular packet transfer. Thus, there need not be a direct correspondence between the number of OS domains supported by the shared I/O controller 1300 and the number of DMA engines 1330-1334 provided, or vice versa. Rather, a shared I/O controller manufacturer may support four OS domains with just one DMA engine 1330, or alternatively may support three OS domains with two DMA engines 1330, 1332, depending on the price/performance mix that is desired.

Further, the arbitration logic 1342 may use an algorithm as simple as round-robin, or alternatively may weight processes differently, either utilizing the type of transaction as the weighting factor, or may employ the OS domain associated with the process as the weighting factor. Other arbitration algorithms may be used without departing from the scope of the present invention.

As is noted above, what is illustrated in FIG. 13 is one embodiment of a shared I/O controller 1300, particularly a shared Ethernet controller 1300, to allow processing of transaction packets from multiple OS domains without regard to the architecture of the OS domains, or to the operating systems executing within the OS domains. As long as the load-store fabric 1302 provides an indication, or other information, which associates a packet to a particular OS domain, an implementation similar to that described in FIG. 13 will allow the distinct OS domains to be serviced by the shared I/O controller 1300. Furthermore, although the shared I/O controller 1300 has been particularly characterized with reference to Ethernet, it should be appreciated by one skilled in the art that similar modifications to existing non-shared I/O controllers, such as Fiber Channel, SATA, and Other controllers may be made to support multiple OS domains and to operate within a shared load-store fabric, as contemplated by the present invention, and by the description herein. In addition, as noted above, embodiments of the shared I/O controller 1300 are contemplated that are integrated into a shared I/O switch, a root complex, or a processing complex.

Figure 14:
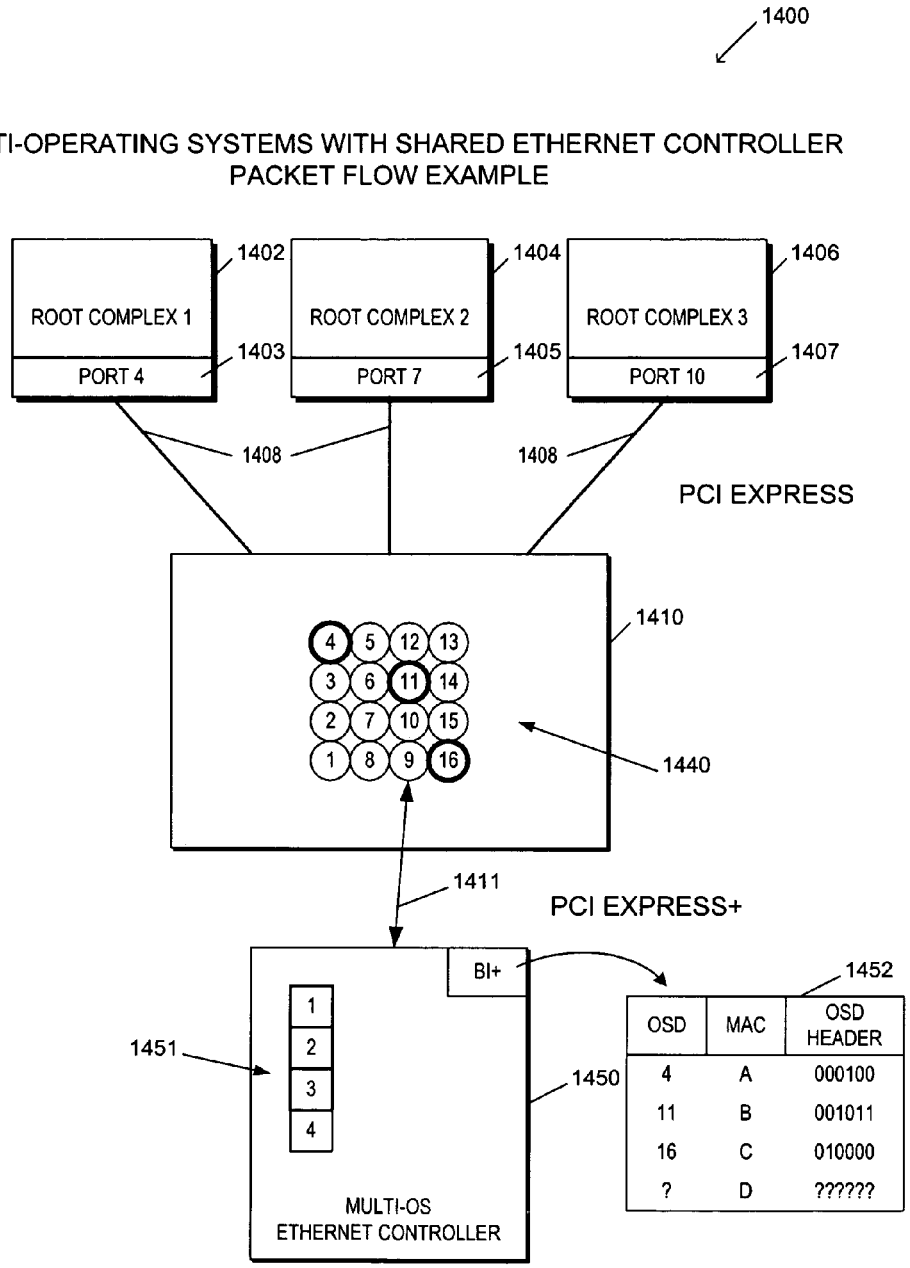
FIG. 14 is an architectural diagram illustrating packet flow from three root complexes to a shared multi-OS Ethernet Controller according to the present invention.

Referring now to FIG. 14, a block diagram is provided of an environment 1400 similar to that described above with respect to FIG. 6, the hundreds digit replaced with a "14". In particular, what is illustrated is a mapping within a shared I/O switch 1410 of three of the ports 1440, particularly ports 4, 11 and 16 to OS domains that associated with root complexes 1402, 1404, and 1406 respectively. For clarity in this example, assume that each root complex 1402, 1404, 1406 is associated with a corresponding OS domain, although as has been noted above, the present invention contemplates association of more than one OS domain with a root complex 1402, 1404, 1406. Accordingly, port 9 of the shared I/O switch 1410 is mapped to a shared I/O Ethernet controller 1450 which has resources 1451 to support four distinct OS domains 1451. In this instance, since there are only three OS domains associated with root complexes 1402, 1404, 1406 which are attached to the shared I/O switch 1410, only three of the resources 1451 are associated for utilization by the controller 1450.

More specifically, a bus interface+ 1452 is shown within the controller 1450 which includes a table for associating an OS domain with a resource 1451. In one embodiment, an OSD Header provided by the shared I/O switch 1410 is associated with one of the four resources 1451, where each resource 1451 includes a machine address (MAC). By associating one of N resources 1451 with an OS domain, transaction packets are examined by the bus interface+ 1452 and are assigned to their resource 1451 based on the OSD Header within the transaction packets. Packets that have been processed by the shared I/O Ethernet controller 1450 are transmitted upstream over a PCI Express+ link 1411 by placing its associated OS domain header within the PCI Express+ transaction packet before transmitting it to the shared I/O switch 1410.

In one embodiment, when the multi-OS Ethernet controller 1450 initializes itself with the shared I/O switch 1410, it indicates to the shared I/O switch 1410 that it has resources to support four OS domains (including four MAC addresses). The shared I/O switch 1410 is then aware that it will be binding the three OS domains associated with root complexes 1402, 1404, 1406 to the shared I/O controller 1450, and therefore assigns three OS domain numbers (of the 256 available to it), one associated with each of the root complexes 1402-1406, to each of the OS resources 1451 within the I/O controller 1450. The multi-OS Ethernet controller 1450 receives the "mapping" of OS domain number to MAC address and places the mapping in its table 1452. Then, when transmitting packets to the switch 1410, the shared I/O controller 1450 places the OS domain number corresponding to the packet in the OS domain header of its PCI Express+ packet. Upon receipt, the shared I/O switch 1410 examines the OS domain header to determine a PCI bus hierarchy corresponding to the value of the OS domain header. The shared I/O switch 1410 uses an internal table (not shown) which associates a PCI bus hierarchy with an upstream port 1440 to pass the packet to the appropriate root complex 1402-1406. Alternatively, the specific OSD numbers that are employed within the table 1452 are predetermined according to the maximum number of OS domains that are supported by the multi-OS Ethernet controller 1450. For instance, if the multi-OS Ethernet controller 1450 supports four OS domains, then OSD numbers 0-3 are employed within the table 1452. The shared I/O controller 1450 then associates a unique MAC address to each OSD number within the table 1452.

In an alternative embodiment, the multi-OS Ethernet controller 1450 provides OS domain numbers to the shared I/O switch 1410 for each OS domain that it can support (e.g., 1, 2, 3, or 4 in this illustration). The shared I/O switch 1410 then associates these OS domain numbers with its port that is coupled to the multi-OS controller 1450. When the shared I/O switch 1410 sends/receives packets through this port, it then associates each upstream OS domain that is mapped to the multi-OS controller 1450 to the OS domain numbers provided by the multi-OS controller 1450 according to the PCI bus hierarchy for the packets. In one embodiment, the OS domain numbers provided by the multi-OS controller 1450 index a table (not shown) in the shared I/O switch 1410 which associates the downstream OS domain number with the PCI bus hierarchy of a packet, and determines an upstream OS domain number from the PCI bus hierarchy. The upstream OS domain number is then used to identify the upstream port for transmission of the packet to the appropriate OS domain. One skilled in the art will appreciate that in this embodiment, the OS domain numbers used between the shared I/O switch 1410 and the shared I/O controller 1450 are local to that link 1411. The shared I/O switch 1410 uses the OS domain number on this link 1411 to associate packets with their upstream OS domains to determine the upstream port coupled to the appropriate OS domains. One mechanism for performing this association is a table lookup, but it should be appreciated that the present invention should not be limited association by table lookup.

While not specifically shown for clarity purposes, one skilled in the art will appreciate that for each port 1440 on the switch 1410, resources applicable to PCI bus hierarchies for each port 1440 (such as PCI-to-PCI bridges, buffering logic, etc.) should be presumed available for each port 1440, capable of supporting each of the OS domains on each port 1440. In one embodiment, dedicated resources are provided for each port 1440. In an alternative embodiment, virtual resources are provided for each port 1440 using shared resources within the shared I/O switch 1410. Thus, in a 16-port switch 1410, 16 sets of resources are provided. Or alternatively, one or more sets of resources are provided that are virtually available to each of the ports 1440. In addition, one skilled in the art will appreciate that one aspect of providing resources for each of the OS domains on each port 1440 includes the provision of link level flow control resources for each OS domain. This ensures that the flow of link level packets is independently controlled for each OS domain that is supported by a particular port 1440.

Figure 15:
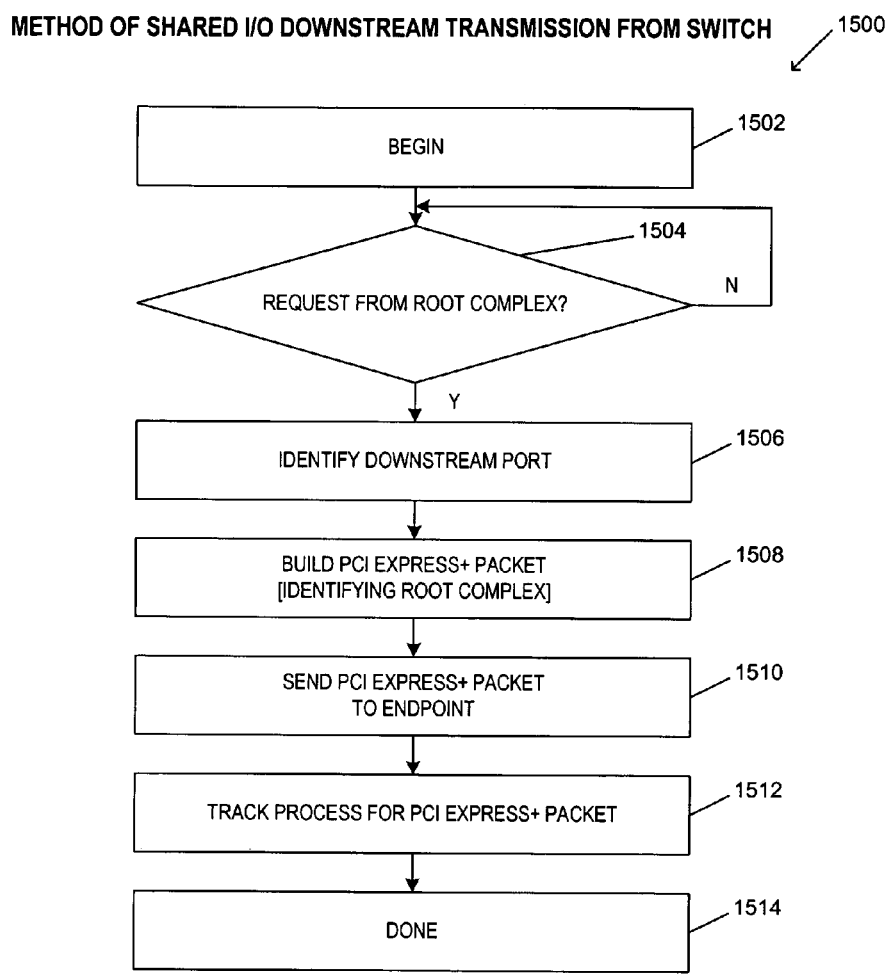
FIGS. 15 and 16 are flow charts illustrating a method of sharing an I/O endpoint device according to the present invention, from the viewpoint of a shared I/O switch looking at a root complex, and from the viewpoint of an endpoint device, respectively.

Referring now to FIG. 15, a flow chart 1500 is provided to illustrate transmission of a packet received by the shared I/O switch of the present invention to an endpoint such as a shared I/O controller.

Flow begins at block 1502 and proceeds to decision block 1504.

At decision block 1504, a determination is made at the switch as to whether a request has been made from an OS domain. For clarity purposes, assume that the single OS domain is a associated with a root complex that is not shared I/O aware. That is, does an upstream port within the shared I/O switch contain a packet to be transmitted downstream? If not, flow returns to decision block 1504. Otherwise, flow proceeds to block 1506.

At block 1506, the downstream port for the packet is identified using information within the packet. Flow then proceeds to block 1508.

At block 1508, the shared I/O aware packet is built. If PCI Express is the load-store fabric which is upstream, a PCI Express+ packet is built which includes an OS Header which associates the packet with the OS domain of the packet (or at least with the upstream port associated with the packet). Flow then proceeds to block 1510.

At block 1510, the PCI Express+ packet is sent to the endpoint device, such as a shared I/O Ethernet controller. Flow then proceeds to block 1512.

At block 1512 a process for tracking the PCI Express+ packet is begun. That is, within a PCI Express load-store fabric, many packets require response tracking. This tracking is implemented in the shared I/O switch, for each OS domain for which the port is responsible. Flow then proceeds to block 1514 where packet transmission is completed (from the perspective of the shared I/O switch).

Figure 16:
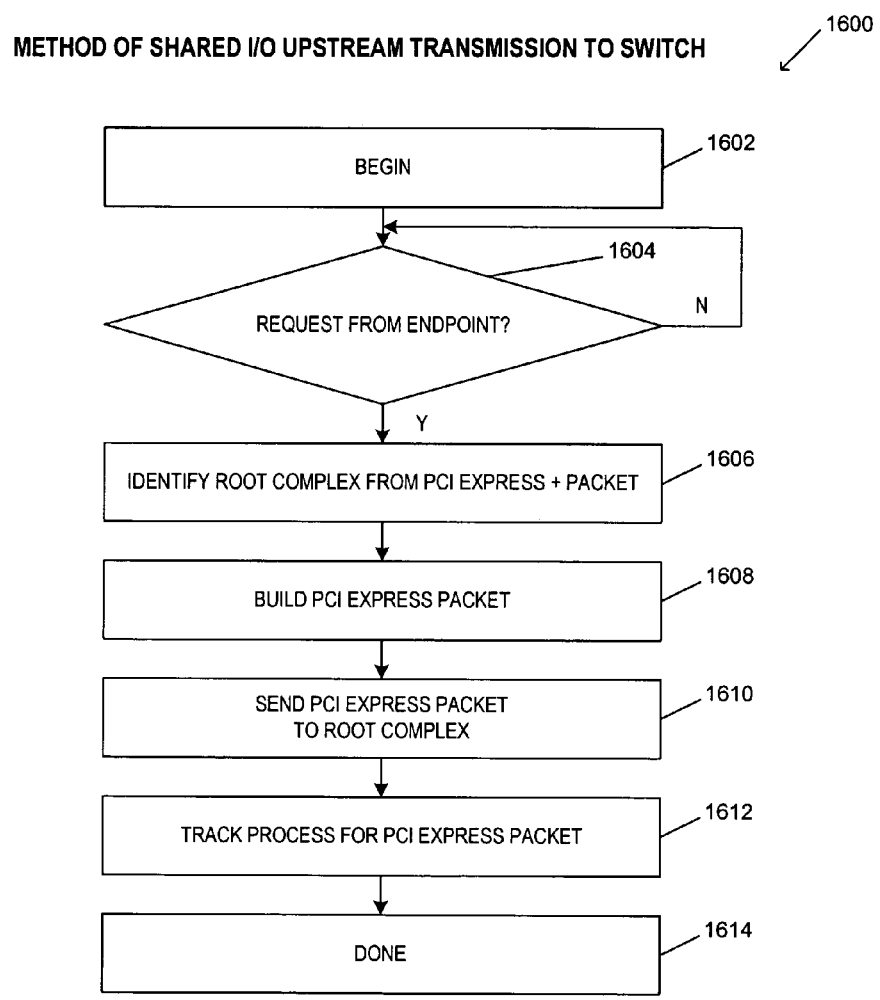

Referring now to FIG. 16, a flow chart 1600 is provided which illustrates transmission of a packet from a shared I/O endpoint to a shared I/O switch according to the present invention. Flow begins at block 1602 and proceeds to decision block 1604.

At decision block 1604 a determination is made as to whether a packet has been received on a port within the shared I/O switch that is associated with the shared I/O endpoint. If not, flow returns to decision block 1604. Otherwise, flow proceeds to block 1606.

At block 1606, the OS Header within the PCI Express+ packet is read to determine which OS domain is associated with the packet. Flow then proceeds to block 1608.

At block 1608, a PCI Express packet is built for transmission on the upstream, non-shared I/O aware, PCI Express link. Essentially, the OSD Header is removed (i.e., decapsulated) from the packet and the packet is sent to the port in the shared I/O switch that is associated with the packet (as identified in the OSD Header). Flow then proceeds to block 1610.

At block 1610, the packet is transmitted to the root complex associated with the OS domain designated by the packet. Flow then proceeds to block 1612.

At block 1612 a process is begun, if necessary, to track the upstream packet transmission as described above with reference to block 1512. Flow then proceeds to block 1614 where the flow is completed.

Figure 17:
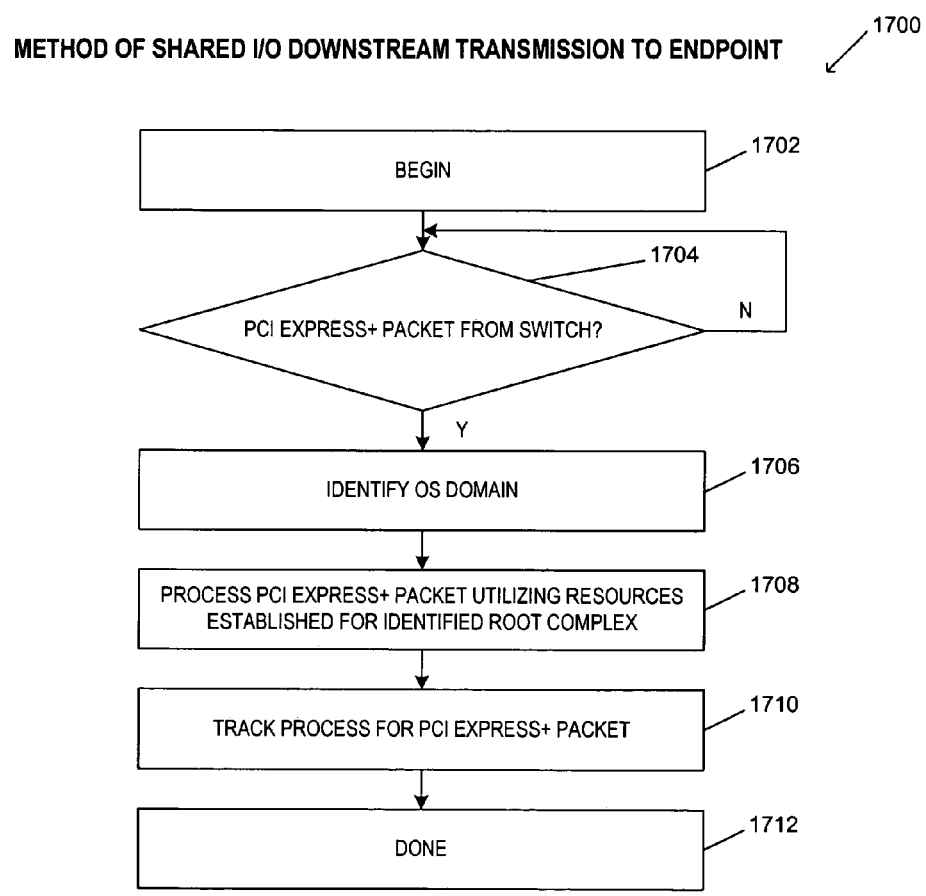
FIGS. 17 and 18 are flow charts illustrating a method of sharing an I/O endpoint device according to the present invention, from the viewpoint of the I/O endpoint device looking at a shared I/O switch.

Referring to FIG. 17, a flow chart 1700 is provided to illustrate a method of shared I/O according to the present invention from the viewpoint of a shared I/O controller receiving transmission from a shared I/O switch. Flow begins at block 1702 and proceeds to decision block 1704.

At decision block 1704, a determination is made as to whether a packet has been received from the shared I/O switch. If the load-store fabric is PCI Express, then the received packet will be a PCI Express+ packet. If no packet has been received, flow returns to decision block 1704. Otherwise, flow proceeds to block 1706.

At block 1706, the OS domain (or upstream port associated with the packet) is determined. The determination is made using the OSD Header within the PCI Express+ packet. Flow then proceeds to block 1708.

At block 1708, the packet is processed utilizing resources allocated to the OS domain associated with the received packet, as described above with reference to FIGS. 13-14. Flow then proceeds to block 1710.

At block 1710, a process is begun, if necessary to track the packet. As described with reference to block 1512, some packets within the PCI Express architecture require tracking, and ports are tasked with handling the tracking. Within the shared I/O domain on PCI Express+, tracking is provided, per OS domain. Flow then proceeds to block 1712 where transmission is completed.

Figure 18:
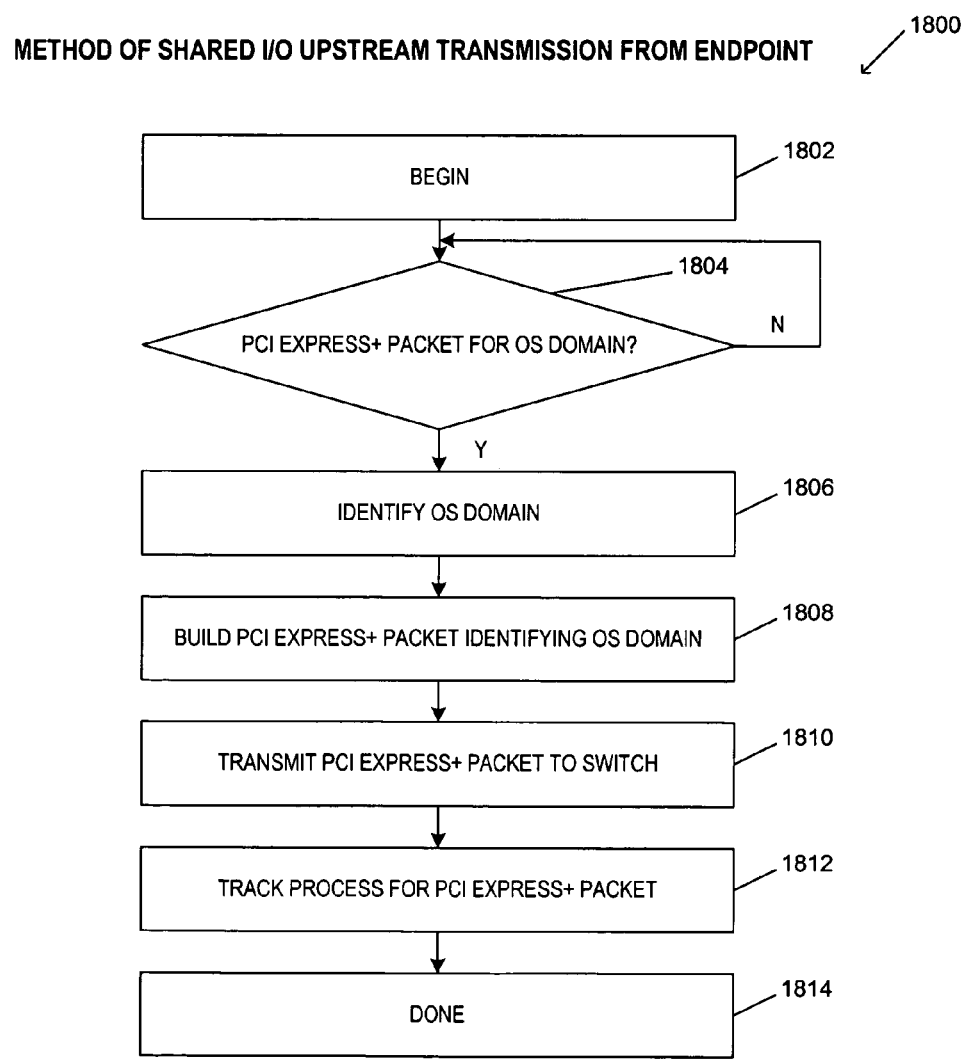

Referring now to FIG. 18, a flow chart 1800 is provided to illustrate transmission upstream from a shared I/O controller to a shared I/O switch. Flow begins at block 1802 and proceeds to decision block 1804.

At decision block 1804, a determination is made as to whether a packet is ready to be transmitted to the shared I/O switch (or other upstream device). If not, flow returns to decision block 1804. Otherwise, flow proceeds to block 1806.

At block 1806, the OS domain (or upstream port) associated with the packet is determined. Flow then proceeds to block 1808.

At block 1808, a PCI Express+ packet is built which identifies the OS domain (or upstream port) associated with the packet. Flow then proceeds to block 1810.

At block 1810, the PCI Express+ packet is transmitted to the shared I/O switch (or other upstream device). Flow then proceeds to block 1812.

At block 1812, tracking for the packet is performed. Flow then proceeds to block 1814 where the transmission is completed.

FIGS. 15-18 illustrate packet flow through the PCI Express+ fabric of the present invention from various perspectives. But, to further illustrate the shared I/O methodology of the present invention, attention is directed to FIG. 19.

Figure 19:
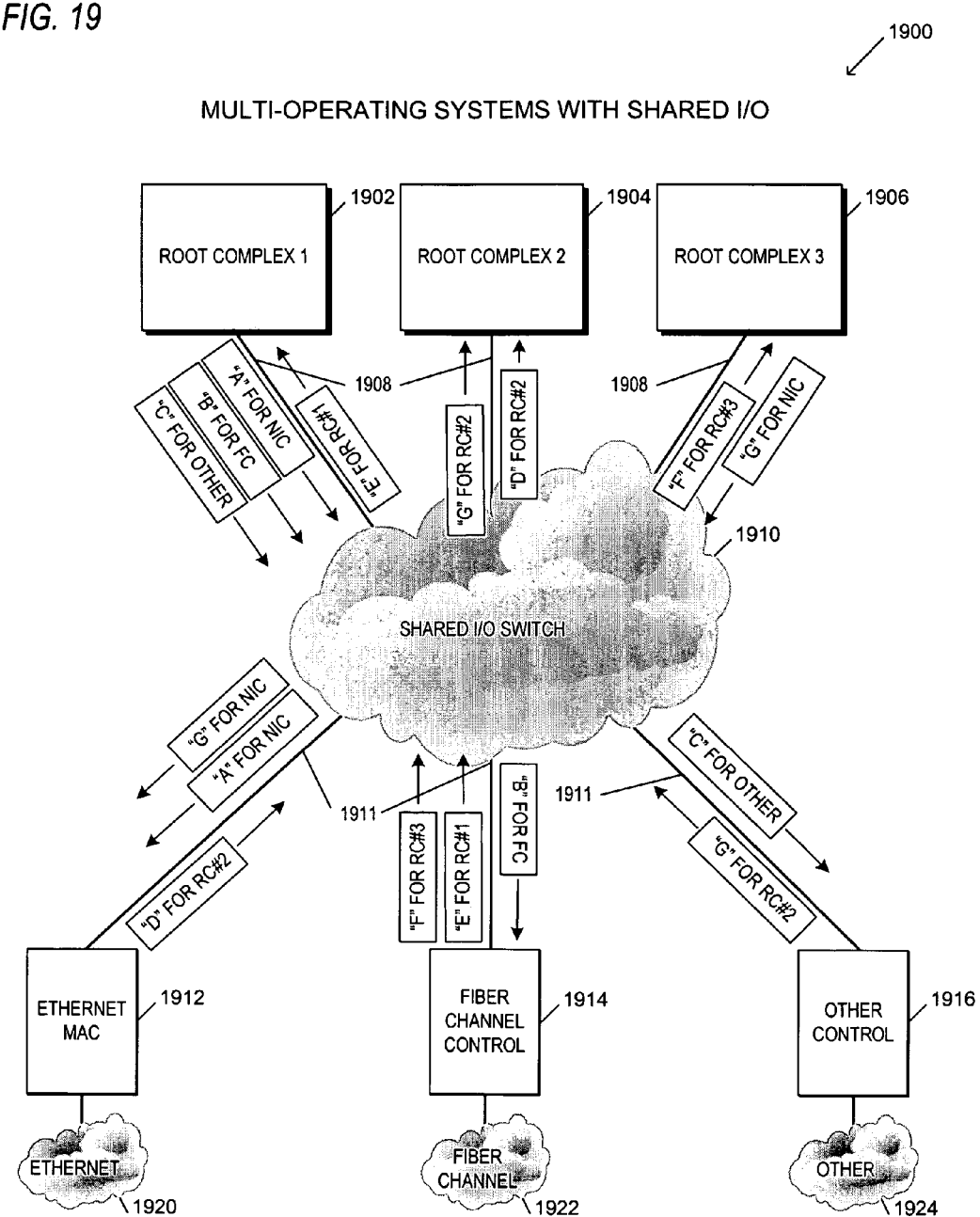
FIG. 19 is an architectural diagram illustrating packet flow from three root complexes to three different shared I/O fabrics through a shared I/O switch according to the present invention.

FIG. 19 illustrates an environment 1900 that includes a number of root complexes (each corresponding to a single OS domain for clarity sake) 1902, 1904, 1906 coupled to a shared I/O switch 1910 using a non-shared load-store fabric 1908 such as PCI Express. The shared I/O switch 1910 is coupled to three shared I/O controllers, including a shared Ethernet controller 1912, a shared Fiber Channel controller 1914, and a shared Other controller 1916. Each of these controllers 1912, 1914, 1916 are coupled to their associated fabrics 1920, 1922, 1924, respectively.

In operation, three packets "A", "B", and "C" are transmitted by root complex 1 1902 to the shared I/O switch 1910 for downstream delivery. Packet "A" is to be transmitted to the Ethernet controller 1912, packet "B" is to be transmitted to the Fiber Channel controller 1914, and packet "C" is to be transmitted to the Other controller 1916. When the shared I/O switch 1910 receives these packets it identifies the targeted downstream shared I/O device (1912, 1914, or 1916) using information within the packets and performs a table lookup to determine the downstream port associated for transmission of the packets to the targeted downstream shared I/O device (1912, 1914, 1916). The shared I/O switch 1910 then builds PCI Express+"A", "B", and "C" packets which includes encapsulated OSD Header information that associates the packets with root complex 1 1902 (or with the port (not shown) in the shared I/O switch 1910 that is coupled to root complex 1 1902). The shared I/O switch 1910 then routes each of the packets to the port coupled to their targeted downstream shared I/O device (1912, 1914, or 1916). Thus, packet "A" is placed on the port coupled to the Ethernet controller 1912, packet "B" is placed on the port coupled to the Fiber Channel controller 1914, and packet "C" is placed on the port coupled to the Other controller 1916. The packets are then transmitted to their respective controller (1912, 1914, or 1916).

From root complex 3 1906, a packet "G" is transmitted to the shared I/O switch 1910 for delivery to the shared Ethernet controller 1912. Upon receipt, the shared I/O switch 1910 builds a PCI Express+ packet for transmission to the shared Ethernet controller 1912 by encapsulating an OSD header within the PCI Express packet that associates the packet with root complex 3 1906 (or with the switch port coupled to root complex 3 1906). The shared I/O switch 1910 then transmits this packet to the shared Ethernet controller 1912.

The Ethernet controller 1912 has one packet "D" for transmission to root complex 2 1904. This packet is transmitted with an encapsulated OSD Header to the shared I/O switch

1910. The shared I/O switch 1910 receives the "D" packet, examines the OSD Header, and determines that the packet is destined for root complex 2 1904 (or the upstream port of the switch 1910 coupled to root complex 2 1904). The switch 1910 strips the OSD Header off (i.e., decapsulation of the OSD header) the "D" packet and transmits the "D" packet to root complex 2 1904 as a PCI Express packet.

The Fiber Channel controller 1914 has two packets for transmission. Packet "F" is destined for root complex 3 1906, and packet "E" is destined for root complex 1 1902. The shared I/O switch 1910 receives these packets over PCI Express+ link 1911. Upon receipt of each of these packets, the encapsulated OSD Header is examined to determine which upstream port is associated with each of the packets. The switch 1910 then builds PCI Express packets "F" and "E" for root complexes 3 1906, and 1 1902, respectively, and provides the packets to the ports coupled to root complexes 3 1906 and 1 1902 for transmission. The packets are then transmitted to those root complexes 1916, 1902.

The Other controller 1916 has a packet "G" destined for root complex 2 1904. Packet "G" is transmitted to the shared I/O switch 1910 as a PCI Express+packet, containing encapsulated OSD header information associating the packet with root complex 2 1904 (or the upstream port in the shared I/O switch coupled to root complex 2 1904). The shared I/O switch 1910 decapsulates the OSD header from packet "G" and places the packet on the port coupled to root complex 2 1904 for transmission. Packet "G" is then transmitted to root complex 2 1904.

The above discussion of FIG. 19 illustrates the novel features of the present invention that have been described above with reference to FIGS. 3-18 by showing how a number of OS domains can share I/O endpoints within a single load-store fabric by associating packets with their respective OS domains. While the discussion above has been provided within the context of PCI Express, one skilled in the art will appreciate that any load-store fabric can be utilized without departing from the scope of the present invention.

Figure 20:
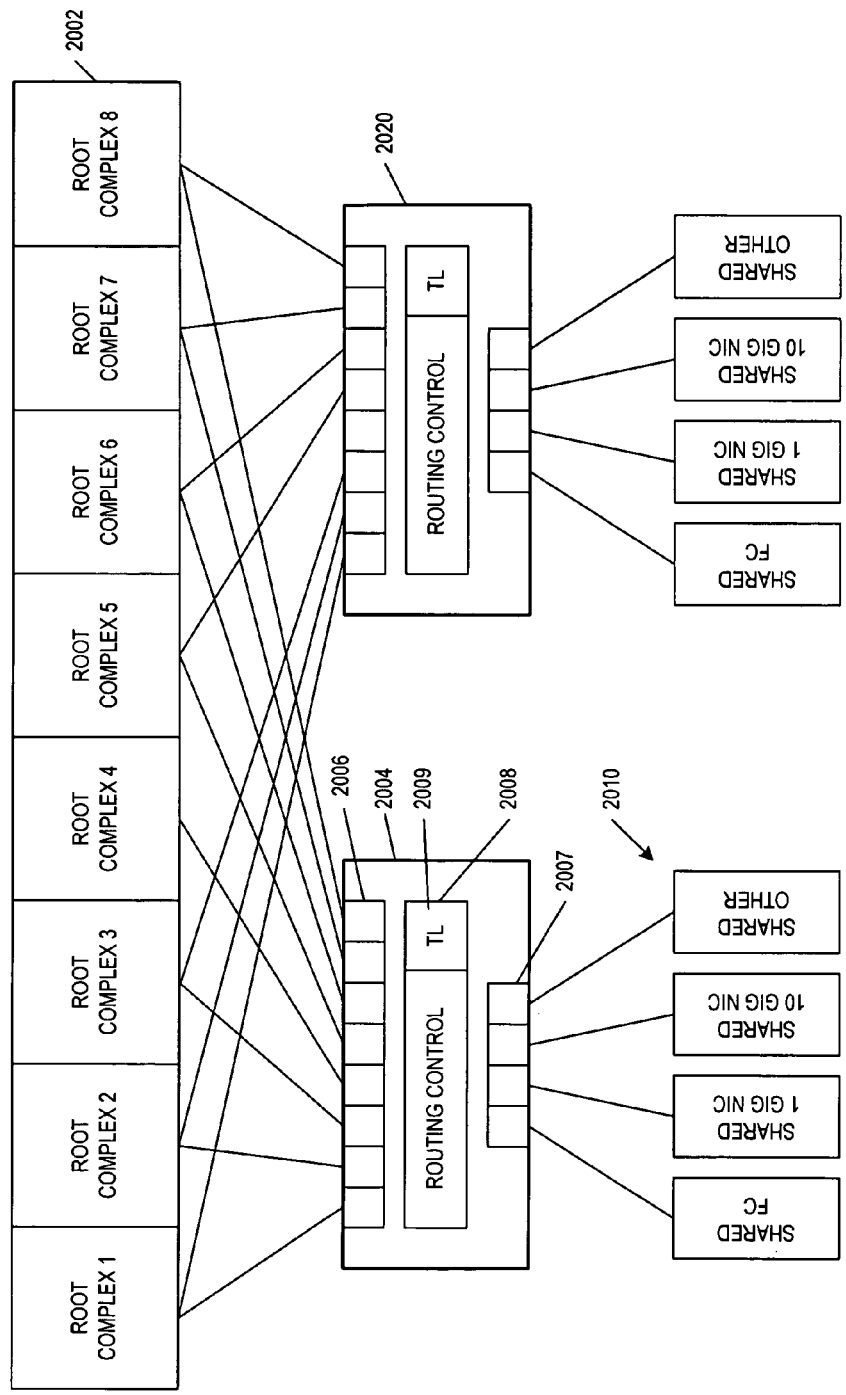
FIG. 20 is an architectural diagram of eight (8) root complexes each sharing four (4) endpoint devices, through a shared I/O switch according to the present invention, redundantly.

Referring now to FIG. 20, a block diagram 2000 is shown which illustrates eight root complexes 2002 which share four shared I/O controllers 2010 utilizing the features of the present invention. For clarity purposes, assume that a single operating system domain is provided for by each of the root complexes however, it is noted that embodiments of the present invention contemplate root complexes that provide services for more than one OS domain. In one embodiment, the eight root complexes 2002 are coupled directly to eight upstream ports 2006 on shared I/O switch 2004. The shared I/O switch 2004 is also coupled to the shared I/O controllers 2010 via four downstream ports 2007. In a PCI Express embodiment, the upstream ports 2006 are PCI Express ports, and the downstream ports 2007 are PCI Express+ ports, although other embodiments might utilize PCI Express+ ports for every port within the switch 2004. Routing Control logic 2008, including table lookup 2009, is provided within the shared I/O switch 2004 to determine which ports 2006, 2007 that to which packets are routed.

Also shown in FIG. 20 is a second shared I/O switch 2020 which is identical to that of shared I/O switch 2004. Shared I/O switch 2020 is also coupled to each of the root complexes 2002 to provide redundancy of I/O for the root complexes 2002. That is, if a shared I/O controller 2010 coupled to the shared I/O switch 2004 goes down, the shared I/O switch 2020 can continue to service the root complexes 2002 using the shared I/O controllers that are attached to it.

While not particularly shown, one skilled in the art will appreciate that many alternative embodiments may be implemented which differ from the above description, while not departing from the spirit and scope of the present invention as claimed. For example, the bulk of the above discussion has concerned itself with removing dedicated I/O from blade servers, and allowing multiple blade servers to share I/O devices though a load-store fabric interface on the blade servers. Such an implementation could easily be installed in rack servers, as well as pedestal servers. Further, blade servers according to the present invention could actually be installed in rack or pedestal servers as the processing complex, while coupling to other hardware typically within rack and pedestal servers such as power supplies, internal hard drives, etc. It is the separation of I/O from the processing complex, and the sharing or partitioning of I/O controllers by disparate complexes that is described herein. And the present inventors also note that employment of a shared I/O fabric according to the present invention does not preclude designers from concurrently employing non-shared I/O fabrics within a particular hybrid configuration. For example, a system designer may chose to employ a non-shared I/O fabric for communications (e.g., Ethernet) within a system while at the same time applying a shared I/O fabric for storage (e.g., Fiber Channel). Such a hybrid configuration is comprehended by the present invention as well.

Additionally, it is noted that the present invention can be utilized in any environment that has at least two processing complexes executing within two independent OS domains that require I/O, whether network, data storage, or other type of I/O is required. To share I/O, at least two operating system domains are required, but the operating system domains can share only one shared I/O endpoint. Thus, the present invention envisions two or more operating system domains which share one or more I/O endpoints.

Furthermore, one skilled in the art will appreciate that many types of shared I/O controllers are envisioned by the present invention. One type, not mentioned above, includes a keyboard, mouse, and/or video controller (KVM). Such a KVM controller would allow blade servers such as those described above, to remove the KVM controller from their board while still allowing an interface to keyboards, video and mouse (or other input devices) from a switch console. That is, a number of blade servers could be plugged into a blade chassis. The blade chassis could incorporate one or more shared devices such as a boot disk, CDROM drive, a management controller, a monitor, a keyboard, etc., and any or all of these devices could be selectively shared by each of the blade servers using the invention described above.

Also, by utilizing the mapping of OS domain to shared I/O controller within a shared I/O switch, it is possible to use the switch to "partition" I/O resources, whether shared or not, to OS domains. For example, given four OS domains (A, B, C, D), and four shared I/O resources (1, 2, 3, 4), three of those resources might be designated as non-shared (1, 2, 3), and one designated as shared (4). Thus, the shared I/O switch could map or partition the fabric as: A-1, B-2, C-3/4, D-4. That is, OS domain A utilizes resource 1 and is not provided access to or visibility of resources 2-4; OS domain B utilizes resource 2 and is not provided access to or visibility of resources 1, 3, or 4; OS domain C utilizes resources 3 and 4 and is not provided access to or visibility of resources 1-2; and OS domain D utilizes resource 4 and shares resource 4 with OS domain C, but is not provided access to or visibility of resources 1-3. In addition, neither OS domain C or D is aware that resource 4 is being shared with another OS domain. In one embodiment, the above partitioning is accomplished within a shared I/O switch according to the present invention.

Furthermore, the present invention has utilized a shared I/O switch to associate and route packets from root complexes associated with one or more OS domains to their associated shared I/O endpoints. As noted several times herein, it is within the scope of the present invention to incorporate features that enable encapsulation and decapsulation, isolation of OS domains and partitioning of shared I/O resources, and routing of transactions across a load-store fabric, within a root complex itself such that everything downstream of the root complex is shared I/O aware (e.g., PCI Express+). If this were the case, shared I/O controllers could be coupled directly to ports on a root complex, as long as the ports on the root complex provided shared I/O information to the I/O controllers, such as OS domain information. What is important is that shared I/O endpoints be able to recognize and associate packets with origin or upstream OS domains, whether or not a shared I/O switch is placed external to the root complexes, or resides within the root complexes themselves.

And, if the shared I/O functions herein described were incorporated within a root complex, the present invention also contemplates incorporation of one or more shared I/O controllers (or other shared I/O endpoints) into the root complex as well. This would allow a single shared I/O aware root complex to support multiple upstream OS domains while packaging everything necessary to talk to fabrics outside of the load-store domain (Ethernet, Fiber Channel, etc.) within the root complex. Furthermore, the present invention also comprehends upstream OS domains that are shared I/O aware, thus allowing for coupling of the OS domains directly to the shared I/O controllers, all within the root complex.

And, it is envisioned that multiple shared I/O switches according to the present invention be cascaded to allow many variations of interconnecting root complexes associated with OS domains with downstream I/O devices, whether the downstream I/O devices shared or not. In such a cascaded scenario, an OSD Header may be employed globally, or it might be employed only locally. That is, it is possible that a local ID be placed within an OSD Header, where the local ID particularly identifies a packet within a given link (e.g., between a root complex and a switch, between a switch and a switch, and/or between a switch and an endpoint). So, a local ID may exist between a downstream shared I/O switch and an endpoint, while a different local ID may be used between an upstream shared I/O switch and the downstream shared I/O switch, and yet another local ID between an upstream shared I/O switch and a root complex. In this scenario, each of the switches would be responsible for mapping packets from one port to another, and rebuilding packets to appropriately identify the packets with their associating upstream/downstream port.

As described above, it is further envisioned that while a root complex within today's nomenclature means a component that interfaces downstream devices (such as I/O) to a host bus that is associated with a single processing complex (and memory), the present invention comprehends a root complex that provides interface between downstream endpoints and multiple upstream processing complexes, where the upstream processing complexes are associated with multiple instances of the same operating system (i.e., multiple OS domains), or where the upstream processing complexes are executing different operating systems (i.e., multiple OS domains), or where the upstream processing complexes are together executing a one instance of a multi-processing operating system (i.e., single OS domain). That is, two or more processing complexes might be coupled to a single root complex, each of which executes their own operating system. Or, a single processing complex might contain multiple processing cores, each executing its own operating system. In either of these contexts, the connection between the processing cores/complexes and the root complex might be shared I/O aware, or it might not. If it is, then the root complex would perform the encapsulation/decapsulation, isolation of OS domain and resource partitioning functions described herein above with particular reference to a shared I/O switch according to the present invention to pass packets from the multiple processing complexes to downstream shared I/O endpoints. Alternatively, if the processing complexes are not shared I/O aware, then the root complexes would add an OS domain association to packets, such as the OSD header, so that downstream shared I/O devices could associate the packets with their originating OS domains.

It is also envisioned that the addition of an OSD header within a load-store fabric, as described above, could be further encapsulated within another load-store fabric yet to be developed, or could be further encapsulated, tunneled, or embedded within a channel-based fabric such as Advanced Switching (AS) or Ethernet. AS is a multi-point, peer-to-peer switched interconnect architecture that is governed by a core AS specification along with a series of companion specifications that define protocol encapsulations that are to be tunneled through AS fabrics. These specifications are controlled by the Advanced Switching Interface Special Interest Group (ASI-SIG), 5440 SW Westgate Drive, Suite 217, Portland, Oreg. 97221 (Phone: 503-291-2566). For example, within an AS embodiment, the present invention contemplates employing an existing AS header that specifically defines a packet path through a I/O switch according to the present invention. Regardless of the fabric used downstream from the OS domain (or root complex), the inventors consider any utilization of the method of associating a shared I/O endpoint with an OS domain to be within the scope of their invention, as long as the shared I/O endpoint is considered to be within the load-store fabric of the OS domain.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for sharing input/output endpoints, the apparatus comprising:
    sharing logic, coupled to a plurality of operating system domains through a load-store fabric, for routing transactions between said plurality of operating system domains and said sharing logic; and
    a first shared input/output endpoint, coupled to said sharing logic, configured to request/complete said transactions for said each of said plurality of operating system domains according to a variant of a protocol, wherein said variant comprises encapsulating an OS domain header within a transaction layer packet that otherwise comports with said protocol, and wherein a particular OS domain header associates a particular transaction layer packet with a particular one of said plurality of operating system domains;
    wherein said sharing logic maps said each of said plurality of operating system domains to a corresponding root complex;
    wherein said corresponding root complex is associated with one or more processing complexes, each comprising:
        a processing core, configured to process data, wherein said processing core accesses a memory that is configured to store said data;
        wherein said data is transferred from said corresponding root complex to said sharing logic and from said sharing logic to said corresponding root complex according to said protocol, and wherein said protocol provides for routing of said transactions only for a single operating system domain.

2. The apparatus as recited in claim 1, wherein said protocol provides for routing of said transactions only for a single operating system domain, and wherein said sharing logic communicates with each of said plurality of operating system domains according to said protocol.

3. The apparatus as recited in claim 1, wherein said load-store fabric comprises a point-to-point fabric.

4. The apparatus as recited in claim 1, wherein said load-store fabric comprises hardware, software, or a combination of hardware and software that is configured to route said transactions.

5. The apparatus as recited in claim 1, wherein said transactions comprise memory read transactions, configured to transfer data to said plurality of operating system domains from said first shared I/O endpoint.

6. The apparatus as recited in claim 1, wherein said transactions comprise memory write transactions, configured to transfer data from said plurality of operating system domains to said first shared I/O endpoint.

7. The apparatus as recited in claim 1, wherein said transactions comprise message transactions, configured to direct said first shared I/O endpoint to perform a specified operation.

8. The apparatus as recited in claim 1, wherein said first shared input/output endpoint comprises a shared network interface controller (NIC).

9. The apparatus as recited in claim 8, wherein said shared NIC comprises a shared Ethernet controller.

10. The apparatus as recited in claim 1, wherein said first shared input/output endpoint comprises a Fiber Channel controller.

11. The apparatus as recited in claim 1, wherein said first shared input/output endpoint comprises a shared RAID controller.

12. The apparatus as recited in claim 1, wherein said first shared input/output endpoint is integrated into a shared I/O switch.

13. The apparatus as recited in claim 1, wherein said first shared input/output endpoint is integrated into a root complex.

14. The apparatus as recited in claim 1, wherein said first shared input/output endpoint is integrated into a processing complex.

15. The apparatus as recited in claim 1, wherein said protocol comprises PCI Express.

16. The apparatus as recited in claim 15, wherein said sharing logic isolates said transactions over a plurality of PCI Express bus hierarchies according to each of said plurality of operating system domains.

17. The apparatus as recited in claim 16, wherein a subset of said transactions are routed in accordance with addressing mechanisms for a particular one of said plurality of PCI Express bus hierarchies, said particular one of said plurality of PCI Express bus hierarchies corresponding to a particular one of said plurality of operating system domains.

18. The apparatus as recited in claim 1, wherein said sharing logic is configured to associate each of said transactions with a corresponding one of said plurality of operating system domains (OSDs), said corresponding one of said plurality of OSDs corresponding to one or more root complexes.

19. The apparatus as recited in claim 18, wherein said plurality of OSDs comprises 16 OSDs.

20. The apparatus as recited in claim 18, wherein said sharing logic designates said corresponding one of said plurality of OSDs according to said variant of said protocol.

21. The apparatus as recited in claim 20, wherein said transaction layer packet is routed between said sharing logic and said first shared I/O endpoint.

22. The apparatus as recited in claim 21, wherein said first shared I/O endpoint is configured to detect said OS domain header and to perform a specified operation according to said protocol exclusively for said one of said plurality of OSDs.

23. The apparatus as recited in claim 1, wherein said shared I/O endpoint designates one of said transactions for said particular one of said plurality of operating system domains by encapsulating said OS domain header within said transaction layer packet, and wherein said transaction layer packet is routed to said sharing logic.

24. The apparatus as recited in claim 23, wherein said sharing logic is configured to detect and decapsulate said OS domain header from said transaction layer packet, and is configured to route said one of said transactions to said particular one of said plurality of operating system domains according to aid protocol.

25. The apparatus as recited in claim 1, wherein said sharing logic comprises a shared I/O switch.

26. The apparatus as recited in claim 1, wherein said sharing logic is integrated within a root complex.

27. The apparatus as recited in claim 1, wherein said sharing logic is integrated within a processing complex.

28. The apparatus as recited in claim 1, further comprising:
    a second shared input/output endpoint, coupled to said sharing logic, configured to request/complete additional transactions for a subset of said plurality of operating system domains.

29. The apparatus as recited in claim 28, wherein said sharing logic is configured to associate each of said additional transactions with one of a plurality of root complexes, said one of a plurality of root complexes corresponding to one of said subset of said plurality of operating system domains.

30. The apparatus as recited in claim 1, further comprising:
second sharing logic, coupled to said sharing logic and to a second shared input/output endpoint, configured route said transactions between said plurality of operating system domains and said second shared input/output endpoint.

31. The apparatus as recited in claim 1, further comprising:
second sharing logic, coupled to said sharing logic, a second shared input/output endpoint, and one of said plurality of operating system domains, configured route said transactions between said one of said plurality of operating system domains and said second shared I/O endpoint, and between said one of said plurality of operating system domains and said sharing logic.

32. The apparatus as recited in claim 1, further comprising:
second sharing logic, coupled to said sharing logic and one or more additional operating system domains, configured to route said transactions between said one or more additional operating system domains and said sharing logic.

33. A shared input/output (I/O) mechanism, comprising:
a load-store fabric, configured to enable operating system domains to share one or more I/O endpoints, said load-store fabric comprising:
sharing logic, coupled to said operating system domains and to said one or more I/O endpoints, for routing first transactions to/from said operating systems domains, and for routing second transactions to/from said one or more I/O endpoints, wherein each of said second transactions designates an associated one of said operating system domains for which an operation specified by each of said first transactions be performed, and wherein said second transactions comport with a variant of a protocol, and wherein said variant comprises encapsulating an OS domain header within a transaction layer packet that otherwise comports with said protocol, and wherein a particular OS domain header associates a particular transaction layer packet with a particular one of said operating system domains;
wherein said sharing logic associates each of said operating system domains with each of a corresponding root complex;
wherein said corresponding root complex is associated with a processing complex that is configured to process data and to accesses a memory that is configured to store said data;
wherein said data is transferred from said root complex to said sharing logic and from said sharing logic to said root complex according to said protocol, and wherein said protocol provides exclusively for a single operating system domain within said load-store fabric.

34. The shared I/O mechanism as recited in claim 33, wherein said first transactions comport with said protocol, and wherein said protocol provides exclusively for a single operating system domain within said load-store fabric.

35. The shared I/O mechanism as recited in claim 33, wherein said load-store fabric comprises a point-to-point fabric.

36. The shared I/O mechanism as recited in claim 33, wherein said load-store fabric comprises a bus.

37. The shared I/O mechanism as recited in claim 33, wherein said first transactions comport with PCI Express.

38. The shared I/O mechanism as recited in claim 37, wherein said sharing logic isolates said first and second transactions over a plurality of PCI Express bus hierarchies according to each of said operating system domains.

39. The apparatus as recited in claim 38, wherein said first and second transactions are routed in accordance with addressing mechanisms for a particular one of said plurality of PCI Express bus hierarchies, said particular one of said plurality of PCI Express bus hierarchies corresponding to said associated one of said operating system domains.

40. The shared I/O mechanism as recited in claim 33, wherein said load-store fabric comprises hardware, software, or a combination of hardware and software that routes said first and second transactions.

41. The shared I/O mechanism as recited in claim 33, wherein said operation comprises a memory read operation, directing that data be transferred from one of said one or more I/O endpoints to said associated one of said operating system domains.

42. The shared I/O mechanism as recited in claim 33, wherein said operation comprises a memory write operation, directing that data be transferred to one of said one or more I/O endpoints from said associated one of said operating system domains.

43. The shared I/O mechanism as recited in claim 33, wherein one of said one or more I/O endpoints comprises a shared network interface controller (NIC).

44. The shared I/O mechanism as recited in claim 43, wherein said shared NIC comprises a shared Ethernet controller.

45. The shared I/O mechanism as recited in claim 33, wherein said one of said one or more I/O endpoints comprises a Fiber Channel controller.

46. The shared I/O mechanism as recited in claim 33, wherein said one of said one or more I/O endpoints comprises a shared RAID controller.

47. The shared I/O mechanism as recited in claim 33, wherein one of said one or more I/O endpoints is integrated into a shared I/O switch.

48. The shared I/O mechanism as recited in claim 33, wherein one of said one or more shared I/O endpoints is integrated into a root complex.

49. The shared I/O mechanism as recited in claim 33, wherein one of said one or more shared I/O endpoints is integrated into a processing complex.

50. The shared I/O mechanism as recited in claim 33, wherein said sharing logic associates each of said first and second transactions with one of a plurality of root complexes, said one of a plurality of root complexes corresponding to one of said operating system domains.

51. The shared I/O mechanism as recited in claim 50, wherein said operating system domains comprise 16 operating system domains.

52. The shared I/O mechanism as recited in claim 33, wherein said variant of said protocol provides exclusively for a single operating system domain within said load-store fabric.

53. The shared I/O mechanism as recited in claim 52, wherein said variant comprises encapsulating said OS domain header within said transaction layer packet of said each of said second transactions, wherein said each of said second transactions otherwise comports with said protocol.

54. The shared I/O mechanism as recited in claim 53, wherein said transaction layer packet is routed between said sharing logic and one of said one or more I/O endpoints.

55. The shared I/O mechanism as recited in claim 54, wherein said one of said one or more I/O endpoints is configured to detect said OS domain header and to perform said operation according to said protocol exclusively for said one of said operating system domains.

56. The apparatus as recited in claim 33, wherein said sharing logic comprises a shared I/O switch.

57. The apparatus as recited in claim 33, wherein said sharing logic is integrated within a root complex.

58. The apparatus as recited in claim 33, wherein said sharing logic is integrated within a processing complex.

59. The shared I/O mechanism as recited in claim 33, wherein one of said one or more I/O endpoints designates one of said second transactions for a particular one of said operating system domains by encapsulating said OS domain header within a particular transaction layer packet, and wherein said particular transaction layer packet is routed to said sharing logic.

60. The shared I/O mechanism as recited in claim 59, wherein said sharing logic is configured to detect and decapsulate said OS domain header from said particular transaction layer packet, and is configured to route a corresponding one of said first transactions to said particular one of said plurality of operating system domains according to a said protocol, and wherein said protocol provides exclusively for a single operating system domain within said load-store fabric.

61. The shared I/O mechanism as recited in claim 33, wherein one of said one or more I/O endpoints is configured to be shared with a first subset of said operating system domains, and wherein a second one of said one or more I/O endpoints is configured to be shared with a second subset of said operating system domains.

62. The shared I/O mechanism as recited in claim 33, further comprising:
second sharing logic, coupled to said sharing logic and to second one or more I/O endpoints, configured route said first transactions, and configured to route third transactions to/from said second one or more I/O endpoints, wherein each of said third transactions designates a second associated one of said operating system domains for which a second operation specified by each of said first transactions be performed.

63. The shared I/O mechanism as recited in claim 33, further comprising:
second sharing logic, coupled to said sharing logic, second one or more I/O endpoints, and one of said operating system domains, configured route said first transactions, and configured to route third transactions to/from said second one or more I/O endpoints and to/from said sharing logic, wherein each of said third transactions designates a second associated one of said operating system domains for which a second operation specified by each of said first transactions be performed.

64. The shared I/O mechanism as recited in claim 33, further comprising:
second sharing logic, coupled to said sharing logic and one or more additional operating system domains, configured route third transactions between said one or more additional operating system domains and said sharing logic, said third transactions comporting with said protocol, wherein said protocol provides exclusively for a single operating system domain within said load-store fabric, and configured to route fourth transactions to/from said sharing logic, wherein each of said fourth transactions designates a corresponding one of said one or more additional operating system domains for which a second operation is to be performed by said one or more I/O endpoints.

65. A method for sharing an input/output (I/O) endpoint within a load-store fabric, comprising:
via sharing logic within the load-store fabric, interconnecting operating system domains to the I/O endpoint;
first communicating with each of the operating system domains individually; and
second communicating with the I/O endpoint according to a variant of a protocol that provides exclusively for a single operating system domain within the load-store fabric to enable the I/O endpoint to associate a prescribed operation with a corresponding one of the operating system domains, wherein the variant comprises encapsulating an OS domain header within a transaction layer packet that otherwise comports with the protocol, and wherein a particular OS domain header associates the transaction layer packet with the corresponding one of the operating system domains;
wherein said first communicating comprises:
within the sharing logic, mapping each of the operating system domains to a corresponding root complex;
wherein the corresponding root complex is associated with one or more processing complexes, each configured to process data, wherein the data is stored in a memory;
transferring the data to and from the corresponding root complex according to the protocol, and wherein said protocol provides exclusively for a single operating system domain within said load-store fabric.

66. The method as recited in claim 65, wherein said interconnecting comprises:
coupling the operating system domains to the I/O endpoint over a point-to-point fabric.

67. The method as recited in claim 65, wherein said interconnecting comprises:
coupling root complexes to the I/O endpoint over a bus.

68. The method as recited in claim 65, wherein said first communicating comprises:
issuing a memory read transaction directing that data be transferred to one of the operating system domains from the I/O endpoint.

69. The method as recited in claim 65, wherein said first communicating comprises:
issuing a memory write transaction directing that data be transferred from one of the operating system domains to the I/O endpoint.

70. The method as recited in claim 65, wherein said first communicating comprises:
issuing a message transaction directing that the I/O endpoint perform the prescribed operation associated with of the corresponding one of the operating system domains.

71. The method as recited in claim 65, wherein the I/O endpoint comprises a shared network interface controller (NIC).

72. The method as recited in claim 71, wherein the shared NIC comprises a shared Ethernet controller.

73. The method as recited in claim 65, wherein the I/O endpoint comprises a Fiber Channel controller.

74. The method as recited in claim 65, wherein the I/O endpoint comprises a shared RAID controller.

75. The method as recited in claim 65, wherein the I/O endpoint is integrated into a shared I/O switch.

76. The method as recited in claim 65, wherein the I/O endpoint is integrated into a root complex.

77. The method as recited in claim 65, wherein the I/O endpoint is integrated into a processing complex.

78. The method as recited in claim 65, wherein said first communicating comprises:
   employing PCI Express as the protocol.

79. The method as recited in claim 78, further comprising:
   isolating transactions over a plurality of PCI Express bus hierarchies according to each of the operating system domains.

80. The method as recited in claim 79, further comprising:
   routing the transactions in accordance with addressing mechanisms for a particular one of the plurality of PCI Express bus hierarchies, the particular one of said plurality of PCI Express bus hierarchies corresponding to the corresponding one of the operating system domains.

81. The method as recited in claim 65, wherein said first communicating comprises:
   associating the each of the operating system domains with each of a plurality of root complexes.

82. The method as recited in claim 81, wherein the plurality of operating system domains comprises 16 operating system domains.

83. The method as recited in claim 65, wherein said second communicating comprises:
   employing the variant of the protocol to associate a unique root complex that with the corresponding one of the operating system domains.

84. The method as recited in claim 83, wherein said employing comprises:
   encapsulating the OS domain header within the transaction layer packet that otherwise comports with the protocol, wherein the value of the OS domain header designates the corresponding one of the operating system domains.

85. The method as recited in claim 84, wherein said second communicating further comprises:
   routing the transaction layer packet between the sharing logic and the I/O endpoint.

86. The method as recited in claim 85, wherein said second communicating further comprises:
   within the I/O endpoint, detecting the OS domain header; and
   performing the prescribed operation according to the protocol, wherein said performing is accomplished exclusively for the corresponding one of the operating system domains.

87. The method as recited in claim 65, wherein the sharing logic comprises a shared I/O switch.

88. The method as recited in claim 65, wherein the sharing logic is integrated within a root complex.

89. The method as recited in claim 65, wherein the sharing logic is integrated within a processing complex.

90. The method as recited in claim 65, wherein said second communicating comprises:
   within the I/O endpoint, designating a second transaction for a particular one of the operating system domains by embedding a second OS domain header within a second transaction layer packet; and
   first routing the second transaction layer packet to the sharing logic.

91. The method as recited in claim 90, wherein said second communicating comprises:
   within the sharing logic, detecting and removing the second OS domain header from the second transaction layer packet.

92. The method as recited in claim 91, wherein said first communicating comprises:
   second routing the second transaction layer packet to the particular one of the operating system domains according to the protocol.

93. The method as recited in claim 65, further comprising:
   third communicating with a second I/O endpoint according to the variant of the protocol to enable the second I/O endpoint to associate specified operations with a corresponding one of a subset of the operating system domains.

94. The method as recited in claim 65, further comprising:
   via second sharing logic within the load-store fabric, second interconnecting additional operating system domains to the sharing logic, whereby the additional operating system domains can share the I/O endpoint.

95. The method as recited in claim 65, further comprising:
   via second sharing logic within the load-store fabric, second interconnecting the operating system domains to the sharing logic and to a second I/O endpoint, whereby the operating system domains can share both the I/O endpoint and the second I/O endpoint.

* * * * *